US012296306B2

(12) United States Patent
Gärtner et al.

(10) Patent No.: US 12,296,306 B2
(45) Date of Patent: May 13, 2025

(54) METHOD AND INSTALLATION FOR HOMOGENIZING A SHEAR THINNING FLUID CONTAINED IN A CYLINDRICAL TANK

(71) Applicant: S.A. LHOIST RECHERCHE ET DEVELOPPEMENT, Ottignies-Louvain-la-neuve (BE)

(72) Inventors: Robert Sebastian Gärtner, Buizingen (BE); Guillaume Criniere, Braine-l'Alleud (BE); David Lyons, Fort Worth, TX (US); Deborah Ballard, Fort Worth, TX (US); Mickey L. Dixon, Jr., Pasadena, TX (US); Narahari N. Kramadhati, La Habra, CA (US)

(73) Assignee: S.A. LHOIST RECHERCHE ET DEVELOPPEMENT, Ottignies-Louvain-la-Neuve (BE)

( * ) Notice: Subject to any disclaimer, the term of this patent is extended or adjusted under 35 U.S.C. 154(b) by 742 days.

(21) Appl. No.: 17/625,027

(22) PCT Filed: Jul. 10, 2020

(86) PCT No.: PCT/EP2020/069673
§ 371 (c)(1),
(2) Date: Jan. 5, 2022

(87) PCT Pub. No.: WO2021/005242
PCT Pub. Date: Jan. 14, 2021

(65) Prior Publication Data

US 2022/0288543 A1 Sep. 15, 2022

Related U.S. Application Data

(60) Provisional application No. 62/872,498, filed on Jul. 10, 2019.

(30) Foreign Application Priority Data

Jul. 17, 2019 (EP) .................................... 19186739

(51) Int. Cl.
*B01F 25/00* (2022.01)
*B01F 23/50* (2022.01)
(Continued)

(52) U.S. Cl.
CPC ............ *B01F 25/21* (2022.01); *B01F 23/511* (2022.01); *B01F 23/59* (2022.01); *B01F 25/104* (2022.01);
(Continued)

(58) Field of Classification Search
CPC ................... B01F 25/21; B01F 25/104; B01F 2215/0431; B01F 2215/045
See application file for complete search history.

(56) References Cited

U.S. PATENT DOCUMENTS 6,109,778 A 8/2000 Wilmer
2010/0080077 A1 4/2010 Coy
2021/0008007 A1 1/2021 Makino et al.

FOREIGN PATENT DOCUMENTS

EP 3418352 A1 12/2018
GB 674461 A 6/1952
(Continued)

OTHER PUBLICATIONS

International Patent Application No. PCT/EP2020/069673 International Search Report and Written Opinion, 12 pages, dated Oct. 20, 2020.
(Continued)

*Primary Examiner* — Anshu Bhatia
(74) *Attorney, Agent, or Firm* — Whitaker Chalk Swindle & Schwartz PLLC; Charles D. Gunter, Jr.

(57) ABSTRACT

The present invention is related to an installation and to a method for recirculating and mixing a fluid which is pref-
(Continued)

erably a shear-thinning fluid. The installation comprises a tank, a pump, a piping assembly connected to the pump and comprising an injection piping for injecting said fluid into the tank and a return piping coupled to the injection piping for pumping the said fluid from the tank to the injection piping, wherein the piping assembly and the tank form a flow recirculation path in which fluid is homogenized by recirculation of the fluid upon action of the said pump, the injection piping being designed such as to reinject the fluid in at least two peripheral bottom locations with an horizontal and/or inclined orientation such as to create a swirl movement in the tank and to reinject simultaneously said fluid upwardly through a central location in a zone comprised between the central axis of the tank and the half radius of the tank such as to create a jet of fluid having a main vertical component.

11 Claims, 13 Drawing Sheets

(51) Int. Cl.

| | |
|---|---|
| ***B01F 25/10*** | (2022.01) |
| ***B01F 25/21*** | (2022.01) |
| ***B01F 25/51*** | (2022.01) |

(52) U.S. Cl.
CPC ...... *B01F 25/51* (2022.01); *B01F 2215/0431* (2013.01); *B01F 2215/045* (2013.01)

(56) References Cited

FOREIGN PATENT DOCUMENTS

| | | |
|---|---|---|
| KR | 20100005450 U | 5/2010 |
| WO | 2021005242 A1 | 1/2021 |

OTHER PUBLICATIONS

International Patent Application No. PCT/EP2020/069673, international filing date Jul. 10, 2020, International Search Report and Written Opinion 10 pages, Oct. 20, 2020.

International Patent Application No. PCT/EP2020/069673, international filing date Jul. 10, 2020, International Preliminary Report on Patentability, 7 pages, Oct. 22, 2021.

METHOD AND INSTALLATION FOR HOMOGENIZING A SHEAR THINNING FLUID CONTAINED IN A CYLINDRICAL TANK

TECHNICAL FIELD

The present invention is related to a method for homogenizing a shear thinning fluid contained in a cylindrical tank by pumping said fluid via a return piping out of said tank and via an injection piping back into said tank. The tank has a central axis, a radius, an internal volume and a height up to which the tank can be filled with said fluid which is greater than twice the radius of the tank. The installation comprises a cylindrical tank and an apparatus for homogenizing the shear thinning fluid in this tank which comprises a feeding pipe provided with nozzles, a suction pipe, and a pump. The apparatus can be provided to a tank such as to form a flow path wherein a fluid provided in the said tank can be recirculated upon operation of the pump such as to provide mixing and homogenizing of the fluid in the tank.

BACKGROUND

Across all supplied industries, fluids such as non-Newtonian fluids, more particularly shear-thinning fluids, including dispersions of solid particles in liquids sometimes referred to as slurries, are typically stored in stirred tanks. While size, shape, design, material and degree of instrumentation on these tanks can vary significantly, they are usually equipped with stirrers including an impeller, a shaft and a motor—often also including a gearbox or drive train.

The exact design and type of the stirrer will depend on the viscosity and settling behavior of the respective product. For low viscosity fluid such as for example diluted milk-of-lime, agitation is typically performed with fast moving propeller stirrers, which create strong vertical circulation to counter settling of the particles. For high viscosity fluids such as for example concentrated and/or very fine milk-of-lime, agitation is rather performed with large bladed, slow moving stirrers with the purpose of keeping the whole volume of the tank in motion and thus much more fluid than in the resting state. In the latter case, the settling is not only countered by the agitation, but much more by the high viscosity.

While the current mixing systems, i.e. the different types of stirrers, are effective and well adapted at maintaining the respective fluids such as milk-of-lime in a well-homogenized state, they are by necessity significantly over-dimensioned.

Milk-of-lime is a suspension of solid particles and as such displays not only settling behavior, i.e. an undesired segregation into supernatant and sediment, but also a challenging rheology. It is shear-thinning ("pseudoplastic") and displays time-dependent destructuring/restructuring effects ("thixotropic"), meaning that under agitation its viscosity is considerably lower than in a resting state, as shown in FIG. 1. For example, a milk of lime having a solid content of 20 wt. % has a viscosity measured by a Brookfield DV-3 Rheometer with the suitable spindle at an agitation of 10 rpm which is 5 times higher than under measurement at 100 rpm. Typically, a set of so-called RV or LV spindles is used and the "suitable spindle" is selected based on the viscosity of the fluid to be tested. The equipment will indicate, whether the correct spindle is used based on the measured resistance to rotation (=torque). If the torque is too high, a smaller spindle needs to be used, if it is too low, one needs to install a larger spindle.

Unlike other materials, the viscosity of milk-of-lime is in the range of 1 to 99° C. independent of temperature. So e.g. 70° C. hot milk-of-lime will have the same viscosity as at room temperature of 20° C. Still it is recommended to conduct all viscosity measurements at a reference temperature of 20° C.

So for transferring & dosing milk-of-lime, it is recommended by experts to keep it fluid and thus under agitation, i.e. in motion, while of course such continuous agitation consumes significant energy.

Depending on its fineness and its content of suspended solids (=particles of mostly calcium hydroxide, $Ca(OH)_2$), milk-of-lime can display a wide range of viscosity—from close to water fluidity, i.e. slightly above 1 mPa·s, to the thickness of yogurt, i.e. more than 1000 mPa·s, see FIG. 1.

This is a consequence of the shear thinning rheology of milk-of-lime: while the viscosity of an agitated milk-of-lime suspension is lowered, any interruption of the agitation will lead to a significant increase in viscosity—typically by an order of magnitude (×10)—or even more.

When re-starting the agitation, the stirrer has thus to provide enough torque (torsion momentum, "twisting force") to turn the impeller in such a much more viscous product—thus logically 10× (or) more than at standard operating conditions.

As such interruptions can be caused by expectable—but not predictable—events such as e.g. a power failure, an equipment failure or a safety shutdown, uninterrupted agitation can thus typically not be guaranteed. The common solution is thus to design the stirrer for the high start-up torque.

But this over-dimensioning is not only necessary for the stirrer. Since the stirrer is commonly placed on the top of the tank, the torque exerted by the motor is also transferred to its support structure, e.g. the lid of the tank and the tank walls. As a result the tank has to be designed to resist this torque next to all other mechanical stresses, resulting in thicker tank walls, a reinforced lid and a heavier support structure, not to mention a (concrete) foundation with higher load capacity to carry the reinforced tank and over-dimensioned stirrer.

For the case, where a tank, designed for another product without any or a less extreme shear thinning behavior than milk-of-lime, such as sodium hydroxide, calcium chloride or ammonia solution, is repurposed for use as milk-of-lime storage or any other kind of shear-thinning fluid, installing a suitable stirrer requires massive modifications. As the existing tank is not designed to carry the stirrer (impeller, shaft, motor, gearbox, etc.) nor to resist the torque, especially not the one required for restart of agitation, typically a separate support frame is required to carry the stirrer. Thus, next to the design, purchase & installation of the stirrer, typically also said support frame for the stirrer has to be designed, assembled & installed, to bear its weight & resist its torque.

This is evidently costly, time consuming, requires specialized engineering expertise and the installation will lead to significant downtime, as the tank cannot be used during modification of the tank itself and the assembly of the stirrer & its support structure.

Various systems are available in the art for mixing a fluid in a tank without the use of a stirrer. However, they are designed for a specific use and comprise feeding pipes or evacuation pipes often arranged under the tanks. Tanks for the storage of fluids used for industrial processes require appropriate means of support such as concrete foundation to support the load of the tank. Therefore, for such kind of tanks initially dedicated for a certain type of fluid and which were built without any mixing device, there is no possibility to provide any known equipment wherein feeding pipe and/or evacuation pipe pass through the base of the tank. This is particularly the case when the tank is placed directly on the ground or otherwise not accessible from the bottom.

Some equipment exists that includes feeding pipes and evacuation pipes which can be provided to a tank without penetrating the base of the tank, but the design of those equipment does not provide a sufficient mixing effect especially for shear-thinning fluids such as concentrated milk of lime.

Tanks containing milk of lime typically have a withdrawal opening close to the bottom of the tank and an aeration opening at the top. A milk of lime dosing pump is usually connected to the bottom opening. Some have attempted to withdraw the fluid from the bottom of the tank and reinjecting it at the top. This followed the engineering rationale, that since milk-of-lime is shear-thinning, it is more viscous before (on the suction side of) the pump, than after the pump (on the pressure side), since the shear in the pump would reduce the viscosity. The hydrostatic pressure of the tank would push the milk of lime into the pump and creates thus shear and shear thinning. The great disadvantage of this design is that it creates a flow from the top to the bottom in the tank, i.e. concurrent with settling. Also, it does not create mixing/turbulence at the bottom of the tank to remove and re-disperse any already formed sediment. This could easily lead to line blockage, cavitation and pump malfunction.

KR20 2010 0005450 discloses a cylindrical tank for storing liquids or mixtures of solids and liquids which may settle. The tank has a height which is about twice its diameter. A recirculation system is provided which comprises a pump for pumping liquid out of the tank and back into the tank. The liquid is hereby mixed and settling of solids is prevented. The recirculation system comprises two injection systems, namely an upper system which comprises a pipe for reintroducing the liquid through an opening in the top of the container and a lower system through which the liquid can be injected in a bottom part of the tank. The lower system comprises four nozzles which are all arranged along the cylindrical wall of the container and parallel thereto to create a swirl movement of the liquid. These nozzles are directed somewhat downward to spray the liquid towards the bottom of the tank. In the center of the tank, a fifth nozzle is provided, which is directed upwards. All the nozzles are identical and spray the liquid at a high pressure under a relatively wide spray angle. Such a mixing system is not suited for mixing shear thinning liquids, which have a relatively high viscosity.

There remains thus the need to provide equipment adapted for mixing and homogenizing a non-Newtonian fluid, more particularly a shear-thinning fluid, which can be retrofitted to an existing tank, especially to an existing tank which has a relatively large height compared to its diameter.

Such equipment must be advantageously simple in construction and should require the least modification possible to the existing tank. Such equipment must also provide good mixing and homogenizing of the fluid in order to provide an accurate dosing of the product to an industrial process.

SUMMARY OF THE INVENTION

According to a first aspect, the present invention is related to a method for homogenizing a shear thinning fluid contained in a cylindrical tank by pumping said fluid via a return piping out of said tank and via an injection piping back into said tank, which tank has a central axis, a radius, an internal volume and a height up to which the tank can be filled with said fluid which is greater than twice the radius of the tank, and which is in particular greater than three times, or even greater than four times the radius of the tank (but usually smaller than ten or even smaller than eight times the radius of the tank), which method comprises the steps of:

producing an upwardly directed jet of said fluid in said tank by means of one central nozzle provided on said injection piping and having one outlet opening for producing said jet, which outlet opening is directed upwards and passes through the central axis of the tank or is arranged at a distance from said central axis which is smaller than half said radius; and creating a swirl movement of said fluid in a bottom portion of the tank by means of at least two off-centered nozzles provided on said injection piping and each having one outlet opening for producing said swirl movement, the outlet openings of the off-centered nozzles being positioned in two peripheral bottom locations within the tank.

The method according to the invention provides a good mixing and homogenizing of fluids, especially for non-Newtonian fluids such as milk of lime, milk of dolime, suspension of alkaline earth metal carbonates or any other suspension with a solid content, which requires homogenization before use in a specific application. The shear thinning fluid may have a viscosity higher 10 mPa·s, or higher than 50 mPa·s or even higher than 100 mPa·s, as measured by a Brookfield DV-3 Rheometer with the appropriate spindle at 100 rpm. Also the viscosity measured at 10 rpm maybe by more than a factor of 2, or more than a factor of 4 or even more than a factor of 6 higher than the viscosity measured at 100 rpm. The at least two off-centered nozzles are used for providing a swirl movement of the fluid. The swirl movement is combined with a single central jet of fluid directed upward provided by the central nozzle to ensure a good mixing and homogenizing from the bottom to the top of the volume of fluid within the tank. The number of off-centered nozzles is preferably smaller than four and more preferably smaller than three, in particular two, such as to provide a jet of fluid from all the nozzles with enough pressure for ensuring a good mixing of the fluid in a bottom portion of the tank and for preventing settling of particles onto the bottom of the tank.

The method according to the invention can advantageously be applied onto an existing tank, without modifications to the tank itself or with limited modifications to the tank. This is particularly the case, when the tank is placed directly on the ground or otherwise not accessible from the bottom.

In an embodiment of the method according to the present invention, said jet of fluid is formed by means of said central nozzle which has a tapered portion, which tapered portion preferably has a conical bore. Preferably, said jet of fluid is formed by means of a tubular outlet portion of said central nozzle, which tubular outlet portion is connected by said tapered portion to said injection piping.

Due to the tapered/conical portion between the injection piping and the tubular outlet portion of the central nozzle a minimum of pressure is lost when the fluid is pressed out of the injection piping into the outlet portion of the nozzle. The tubular outlet portion of the central nozzle produces one jet of fluid and minimizes divergence of this jet. By providing one concentrated upright jet of liquid, friction with and consequently dispersion of the jet into the surrounding fluid in the tank can be minimized, so that the jet of fluid may reach a maximum height in the fluid contained in the tank. The present inventors have found that the upright jet of fluid should indeed cause movements at the surface of the fluid in order to obtain a good mixing of the fluid, also in the higher zone thereof.

Preferably, the tubular outlet portion of the central nozzle has an inner bore having a substantially constant inner diameter.

In an embodiment of the method according to the present invention, or according to the preceding embodiment, said swirl movement of said fluid is created by means of said at least two off-centered nozzles which each have a tapered portion, which tapered portion preferably has a conical bore. Preferably, said swirl movement of said fluid is created by means of a tubular outlet portion of each of said off-centered nozzles, which tubular outlet portion is connected by said tapered portion to said injection piping.

Due to the conical portion between the injection piping and the tubular outlet portions of the off-centered nozzles, a minimum of pressure is lost when the fluid is pressed out of the injection piping into the outlet portions of the off-centered nozzles. The tubular outlet portions of the off-centered nozzles each produce one jet of fluid and minimizes divergence of this jet. The kinetic energy and impulse of the fluid which is pumped through the injection piping can thus be maximally used to create the swirl movement required to achieve an efficient mixing of the fluid contained in the tank, in particular in a bottom portion thereof.

Preferably, the tubular outlet portions of the off-centered nozzles have an inner bore having a substantially constant inner diameter.

In an embodiment of the method according to the present invention, or according to any one of the preceding embodiments, said fluid comprises milk of lime, milk of dolime and/or a suspension of alkaline earth metal carbonates. The fluid preferably comprises milk of lime and/or milk of dolime.

These fluids have a relatively high viscosity, especially when they have not been stirred for some time, so that when no mechanical stirrer is provided on the tank, mixing and homogenising of these fluid is problematic. The method according to the present invention offers however also a solution for mixing and homogenising such fluids.

Preferably, the shear-thinning fluid has a viscosity of less than 1000 mPa·sec, preferably less than 600 mPa·sec, most preferably less than 300 mPa·sec, as measured by a Brookfield DV-3 Rheometer with the appropriate spindle at 100 rpm. Also the viscosity measured at 10 rpm is preferably by less than by a factor of 15 higher than the viscosity measured at 100 rpm, more preferably less than by a factor of 10 higher.

In an embodiment of the method according to the present invention, or according to any one of the preceding embodiments, said fluid is homogenized during at most 4 hours per day.

Due to the efficient mixing and homogenisation of the fluid, it can be homogenised in a short period of time and the fluid does not need to be homogenised all the time. In this way, a lot of energy can be saved.

In an embodiment of the method according to the present invention, or according to any one of the preceding embodiments, said fluid is supplied at a predetermined flow rate ($F_{CN}$) to said central nozzle which is at least equal to 1.0 times the internal volume (V) of said tank per hour, and which is preferably at least equal to 1.4 times the internal volume (V) of said tank per hour.

It has been found that a minimum number of tank volume turns per hour should preferably be achieved by the fluid which is circulated through the central nozzle to enable to achieve an efficient mixing of the fluid contained in the tank, especially when this fluid is quite viscous.

In an embodiment of the method according to the present invention, or according to any one of the preceding embodiments, said fluid is supplied at a predetermined total flow rate ($F_{tot}$) to said central nozzle and to said off-centered nozzles which is at least equal to 1.75 times, preferably at least 2.2 times and more preferably at least 2.5 times the internal volume (V) of said tank per hour.

It has been found that a minimum number of tank volume turns per hour should preferably be achieved by the fluid which is circulated through the central nozzle and the off-centered nozzle to enable to achieve an efficient mixing of the fluid contained in the tank, especially when this fluid is quite viscous.

In an embodiment of the method according to the present invention, or according to any one of the preceding embodiments, said upwardly directed jet of said fluid is produced by means of the outlet opening of the central nozzle, which is provided at a height of at least 20 cm, preferably at a height of at least 50 cm above the height of the outlet openings of said off-centered nozzles. In another embodiment of the method according to the present invention, or according to any one of the preceding embodiments, said upwardly directed jet of said fluid is produced by means of the outlet opening of the central nozzle which is provided at a height of at least one tenth, preferably at least one eighth, and more preferably at least one quarter of the height of the tank above the bottom of the tank.

The larger the difference in height between the central nozzle and the top of the tank, the higher the flow rate should be. Also the larger the surface area of the outlet opening of the central nozzle, the higher the flow rate through this nozzle should be. For a same flow rate, a larger surface area of the outlet opening corresponds indeed to a lower velocity of the liquid which is ejected by the nozzle (and a lower pressure which has to be applied to that liquid). By placing the central nozzle at a larger distance above the off-centered nozzles, a smaller flow rate is required through the central nozzle to enable to achieve an efficient mixing of the fluid.

In an embodiment of the method according to the present invention, or according to any one of the preceding embodiments, said fluid is supplied at a predetermined flow rate ($F_{CN}$) to said central nozzle, the outlet opening of which has a predetermined surface area ($A_{CN}$) and is located at a predetermined height ($H_{CN}$) in said tank, which tank is arranged to be filled with said fluid at most up to the height (H) thereof, with said predetermined flow rate ($F_{CN}$) of the fluid supplied to said central nozzle being defined by the following formula:

$$\frac{F_{CN}}{A_{CN}} \geq (H - H_{CN})/\text{sec},$$

and preferably by the formula $$\frac{F_{CN}}{A_{CN}} \geq 1.1.(H - H_{CN})/\text{sec}$$

wherein:

- $F_{CN}$: the flow rate, in ml/s, of said fluid through the central nozzle;
- H: the height of the tank in cm;
- $H_{CN}$: the height, in cm, at which the outlet opening of the central nozzle is located above the bottom of the tank; and
- $A_{CN}$: the surface area, in $cm^2$, of the outlet opening of the central nozzle.

The value of the average velocity of the fluid in the outlet opening of the central nozzle, in cm/s, should thus according to this embodiment be larger than 100%, preferably 110% of the value of the height difference between the top of the tank and the outlet opening of the central nozzle, in cm. For a predetermined flow rate of fluid to the central nozzle, the size of the outlet opening of the central nozzle can thus be selected to achieve the required velocity of the fluid which is ejected by the central nozzle. It was found quite by surprise that there appears to be a linear relationship with the height of the tank above the central nozzle and the required velocity of the jet of fluid projected by the central nozzle.

In an embodiment of the method according to the present invention, or according to any one of the preceding embodiments, said fluid is supplied at a predetermined flow rate ($F_{CN}$) to said central nozzle and at a predetermined total flow rate ($F_{tot}$) to said central nozzle and to said off-centered nozzles, said predetermined flow rate being at least equal to half of said predetermined total flow rate.

It has been found that less energy is required to enable to achieve an efficient mixing of the fluid, when at least half of the total flow rate is provided to the central nozzle.

The present invention also relates to an installation for carrying out the method according to the present invention.

This installation comprises:

- a cylindrical tank containing a shear thinning fluid and having a central axis, a radius, an internal volume and a height up to which the tank can be filled with said fluid which is greater than twice the radius of the tank;
- a pump;
- a piping assembly connected to the pump and comprising:
  - an injection piping for injecting said fluid into the tank: and
  - a return piping coupled to the injection piping for pumping said fluid from the tank to the injection piping.

The piping assembly and the tank form a flow recirculation path in which the said fluid is homogenized by recirculation of the fluid upon action of the said pump, and the injection piping comprises a portion extending in a bottom portion of the tank through a central zone comprised between the central axis of the tank and the half radius of the tank and between at least two locations in a peripheral zone within the tank, and comprises:

- a central nozzle having one outlet opening passing through the central axis of the tank or arranged at a distance relative to the central axis inferior to the half radius of the tank, the outlet opening of the central nozzle being oriented upwards to provide said jet of fluid directed upwardly; and
- at least two off-centered nozzles arranged on both sides of the said central nozzle such as to create a swirl movement of the said fluid.

Preferably, the said recirculation flow path is adapted to be coupled to an external duct selectively opened or closed for respectively supplying said fluid into the flow path or evacuating said fluid out of the flow path.

In an embodiment of the installation according to the present invention, said central nozzle has a tapered portion, which tapered portion preferably has a conical bore. The central nozzle preferably comprises a tubular outlet portion forming said outlet opening, which tubular outlet portion is connected by said tapered portion to said injection piping.

Due to the tapered/conical portion between the injection piping and the tubular outlet portion of the central nozzle a minimum of pressure is lost when the fluid is pressed out of the injection piping into the nozzle. The tubular outlet portion of the central nozzle produces one jet of fluid and minimizes divergence of this jet. By providing one concentrated upright jet of liquid, friction with and consequently dispersion of the jet into the surrounding fluid in the tank can be minimized so that the jet of fluid may reach a maximum height in the fluid contained in the tank. The present inventors have found that the upright jet of fluid should indeed cause movements at the surface of the fluid in order to obtain a good mixing of the fluid, also in the higher zone thereof.

Preferably, the tubular outlet portion of the central nozzle has an inner bore having a substantially constant inner diameter.

In an embodiment of the installation according to the present invention, or according to any one of the preceding embodiments, said at least two off-centered nozzles each have a tapered portion, which tapered portion preferably has a conical bore. Preferably, said off-centered nozzles each comprise a tubular outlet portion, which tubular outlet portions are connected by said tapered portions of the off-centered nozzles to said injection piping. The tubular outlet portions of the off-centered nozzles have preferably an inner bore having a substantially constant inner diameter.

In an embodiment of the installation according to the present invention, or according to any one of the preceding embodiments, the outlet opening of the central nozzle is provided at a height of at least 20 cm, preferably at a height of at least 50 cm above the height of the outlet openings of said off-centered nozzles. In another embodiment of the installation according to the present invention, or according to any one of the preceding embodiments, the outlet opening of the central nozzle is provided at a height of at least one tenth, preferably at least one eighth, and more preferably at least one quarter of the height of the tank above the bottom of the tank.

By placing the central nozzle at a larger distance above the off-centered nozzles, a smaller flow rate is required through the central nozzle to enable to achieve an efficient mixing of the fluid.

In an embodiment of the installation according to the present invention, or according to any one of the preceding embodiments, said off-centered nozzles are arranged with their outlet openings in a peripheral zone in the tank comprised between the inner wall of the tank and a distance relative to the inner wall of the tank inferior or equal to half the radius of the tank, preferably inferior or equal to one third of the radius of the tank, more preferably inferior or equal to one fifth of the radius of the tank, the outlet openings of the off-centered nozzles being preferably spaced from the inner wall of the tank at a distance of at least 2 cm. Preferably, the outlet openings of the off-centered nozzles are situated at a distance, in the radial direction of the tank, between 10 and 20 cm from the wall of the tank.

Such a position of the off-centered nozzles was found to be advantageous to be able to create the swirl motion required to mix and swirl up the fluid from the bottom and in a bottom portion of the tank.

In an embodiment of the installation according to the present invention, or according to any one of the preceding embodiments, the off-centered nozzles are arranged at a height relative to the bottom of the tank inferior or equal to a quarter of the height of the tank, preferably inferior or equal to one eighth of the height of the tank, more preferably inferior or equal to one tenth of the height of the tank.

Such a position of the off-centered nozzles was also found to be advantageous to be able to create the swirl motion required to mix and swirl up the fluid from the bottom and in a bottom portion of the tank.

In an embodiment of the installation according to the present invention, or according to any one of the preceding embodiments, said off-centered nozzles are oriented towards the same circumferential direction. Preferably, said off-centered nozzles are oriented along a plane orthogonal to the central axis of the tank or are inclined upwardly relative to the orthogonal plane, preferably under an angle of at most 20° relative to said orthogonal plane.

This embodiment is also advantageous to effectively homogenise and move up the solid material contained in the bottom portion of the tank to mix it with the less concentrated fluid in the higher zones of the tank.

In an embodiment of the installation according to the present invention, or according to any one of the preceding embodiments, wherein the surface area ($A_{CN}$) of the outlet opening of the central nozzle is larger than or equal to the sum of the surface areas of the outlet openings of the off-centered nozzles.

The larger surface area of the outlet opening of the central nozzle enables to achieve a larger upward flow of fluid in the tank. It was found that in this way a more efficient mixing can be achieved, especially in a relatively high tank.

Preferably, the return piping comprises an inlet arranged in the tank at a height below the said nozzles (e.g. the said central nozzle and the said off-centered nozzles). The fluid for recirculation in the flow path being pumped through the inlet, such a position reduces the possibility of particles to settle on the bottom of the tank.

In an embodiment of the installation according to the present invention, or according to any one of the preceding embodiments, the inlet of the return piping is arranged in the circumferential direction of the flow from each of said off-centered nozzle at a minimum distance relative to the outlet of each of the said off-centered nozzle superior to the half radius of the tank, preferably superior to the radius of the tank.

Preferably, the said off-centered nozzles extend from the injection piping and have an inner bore shrinking gradually or continuously towards their outlets.

In one embodiment, the installation is configured such that the injection piping and the return piping pass through the same opening of the tank, so that no further modification to the tank has to be done for providing any further opening.

In another embodiment, the installation can be adapted to a tank provided with two openings, without requiring any modification on the tank, wherein the injection piping passes through a first opening of the tank and the return piping is connected to a second opening of the tank.

Preferably, the injection piping extends along a bottom half portion of the tank, more preferably close to the base of the tank, preferably at a height less than 1 meter from the base of the tank, more preferably at a height inferior than 50 cm from the base of the tank.

The position of the at least two off-centered nozzles into the tank provides a swirl movement keeping the fluid close to the bottom of the tank in motion to prevent any deposit or sedimentation of particles in the bottom of the tank. Almost all vertical mixing, certainly all vertical mixing beyond the lower third of the tank, is mainly due to the vertical injection by the central nozzle.

The said off-centered nozzles are oriented towards the same circumferential direction, i.e. clockwise or counter-clockwise.

The off-centered nozzles are arranged advantageously at a height relative to the bottom of the tank inferior to 50 cm, preferably inferior to 25 cm and more preferably inferior to 15 cm.

Preferably, the said central nozzle extends towards an upper portion of the tank from the injection piping up to a distance of at least 20 cm, preferably up to 50 cm, relative to the injection piping, more preferably up to a distance up to one third of the height of the tank relative to the bottom of the tank, in some embodiments up to a distance up to the half of the height of the tank relative to the bottom of the tank.

Preferably, the said inlet of the said return piping is arranged in the circumferential direction of the flow from each of the said off-centered nozzle at a minimum distance relative to the outlet of each of the said off-centered nozzle superior to the half radius of the tank, preferably superior to the radius of the tank. The inlet of the return piping is advantageously arranged within the tank at a distance far enough from the off-centered nozzles to minimize interference of the suction effect provided by the return piping with the swirl movement and upward movement of the fluid respectively provided by the off-centered nozzles and the central nozzle.

Preferably, the area of the opening of the said central nozzle is larger than the area of the opening of the said off-centered nozzles.

More preferably, the sum of the areas of the opening of the off-centered nozzle should be less or equal to the area of the opening of the central nozzle, such that the fluid can leave the outlets of the off-centered nozzle with enough pressure to provide the swirl movement of the fluid in the tank. The reason for limiting the sum of the area of the off-center nozzles to less or equal the area of the central nozzle is to improve the fountain effect (in other words the upward movement of the fluid), especially for high and narrow tanks wherein more upward movement than swirl is required to mix all areas of the tank.

In one embodiment, the tank has a lateral opening and the said injection piping and return piping are passing through the said lateral opening of the tank.

In another embodiment, the tank has two lateral openings, the said injection piping passes through one of the said lateral openings and the return piping is connected or passes through the other one of the said lateral openings.

In another embodiment, the tank has an upper opening, and the injection piping and the return piping extends from the said upper opening to a bottom portion of the tank.

In another embodiment, the tank has an upper opening and a lateral opening, the injection piping passing through the lateral opening and the return piping passing through the upper opening.

In one embodiment, the said injection piping and return piping extends within the tank through the same opening.

In one embodiment of the installation the pump is arranged outside the tank.

Advantageously, the pump is placed next to the tank, so the tank structure does not have to carry the weight of the pump. The pump does not provide torque to the structure, contrary to the stirrers commonly used in prior art for mixing shear-thinning fluids in tanks.

The tank structure does thus not to be over-dimensioned or reinforced and any tank used for Newtonian liquid storage can be easily converted for non-Newtonian, more particularly for shear-thinning, fluid storage.

In an alternative embodiment, the pump is a submersible pump located inside the tank. The submersible pump is advantageously coupled to the return pipe. Advantageously, the use of a submersible pump inside the tank allows locating almost all of the piping assembly or the whole piping assembly inside the tank.

The type of pump and its power is advantageously selected from simulation computations taking into account the dimensions of the tank and of the piping.

According to a further aspect, the present invention is related to a method for recirculating and homogenizing a fluid, preferably a shear thinning fluid, in a tank having at least one opening, a central axis, a radius, and a height greater than its radius, preferably greater than twice the radius comprising the steps of:

i) providing to the tank an injection piping and a return piping to form a flow recirculation path;
ii) coupling an external duct to the said flow recirculation path for supplying said fluid into the tank;
iii) filling the said tank with said fluid;
iv) uncoupling the said external duct from the flow recirculation path, and;
iv) pumping the said fluid from the return piping to the injection piping wherein the injection piping is designed such as to reinject the fluid in at least two peripheral bottom locations with an horizontal and/or inclined orientation such as to create a swirl movement in the tank and to reinject simultaneously said fluid upwardly through a central location in a zone comprised between the central axis of the tank and the half radius of the tank such as to create a jet of fluid having a main vertical component.

Preferably, the method further comprises a step of coupling an external duct to the said tank and to an external container and pumping the said fluid from the tank to the said external container through the said duct.

In one embodiment of the method, the said fluid is recirculated and mixed during at least 30 minutes per day.

In one embodiment of the method, the said fluid is recirculated and mixed during at most 4 hours per day.

In one embodiment of the method, the said fluid is a non-Newtonian, in particular shear-thinning, fluid such as milk of lime, milk of dolime, suspension of alkaline earth metal carbonates or any other suspension with a solid content which requires homogenization before use.

Figure 1:
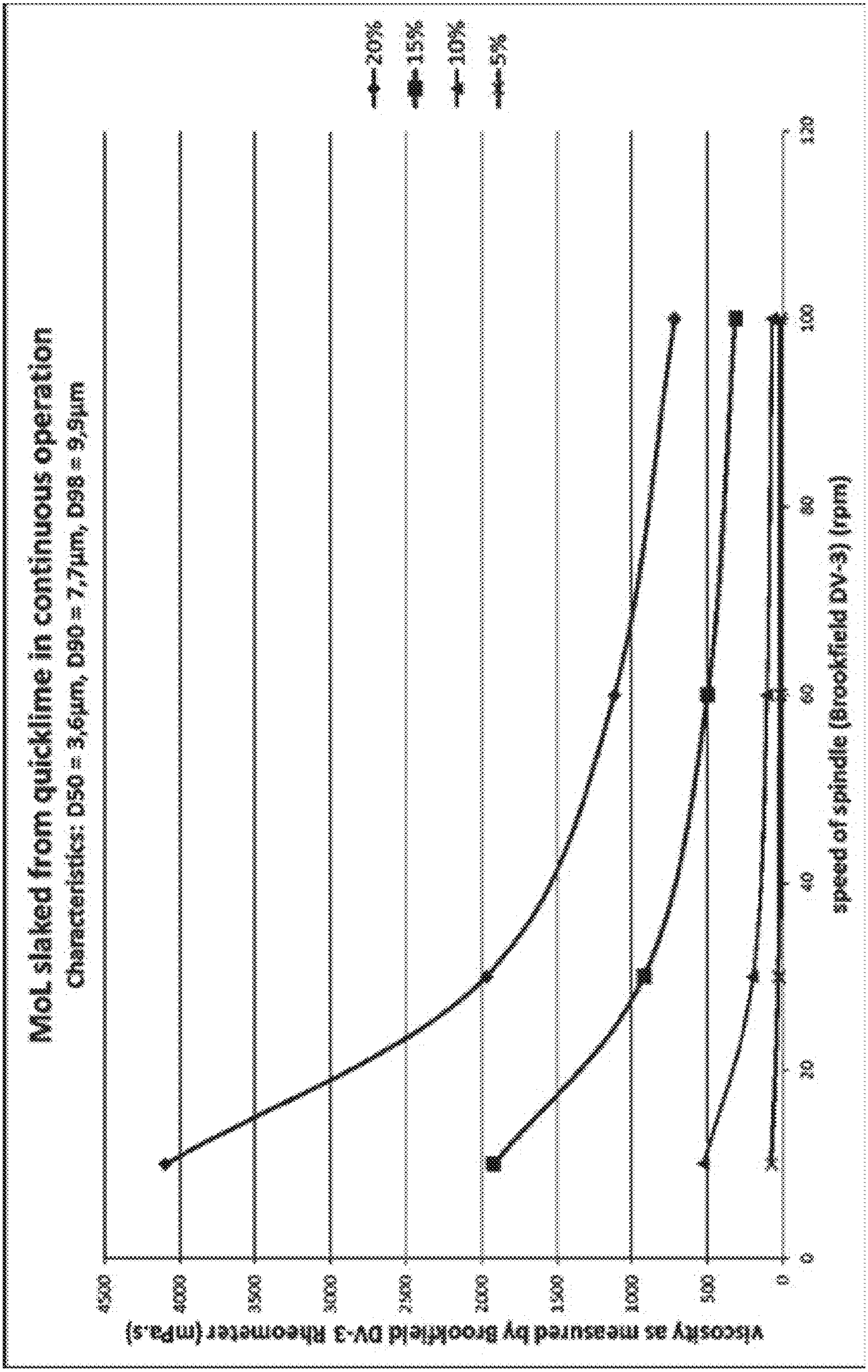
FIG. 1 is a graph showing the viscosity of milk of lime suspensions of solid contents of 5, 10, 15 and 20 wt. %, having a $d_{50}$ of 3.6 μm, a $d_{90}$ of 7.7 μm and a $d_{98}$ of 9.9 μm, the viscosity being measured with a Brookfield DV-3 Rheometer for different solid content at different speed of spindle.

It is to be noted that the drawings are not to scale and are not limitative for the present invention. In particular, the injection piping and especially the off-centered nozzles are in reality preferably at a lower level than illustrated schematically in FIGS. 4 to 7.

DESCRIPTION OF THE INVENTION

Some embodiments of an installation for recirculating and mixing a fluid in a tank are presented herein with references to FIGS. 2 to 9.

The installation according to the invention comprises a cylindrical tank and an apparatus for recirculating and mixing a fluid in this tank. The tank has at least one opening 201, 202, a central axis 203, a radius, and a height greater than twice the said radius, said apparatus comprising:

- a pump 101;
- a piping assembly connected to the pump 101 and comprising:
  - an injection piping 102 for injecting said fluid into the tank 200; and
  - a return piping 103 coupled to the injection piping 102 for pumping the said fluid from the tank to the injection piping;

wherein the piping assembly and the tank form a flow recirculation path in which the said fluid is homogenized by recirculation of the fluid upon action of the said pump, characterized in that the injection piping 102 comprises a portion adapted to extend in a bottom portion 205 of the tank 200 through a central zone 207 of the tank comprised between the central axis 203 of the tank and the half radius of the tank and between at least two locations 206*a*, 206*b* in a peripheral zone 204 within the tank, and comprises:

- a central nozzle 105 having an outlet passing through the central axis 203 of the tank or arranged at a distance relative to the central axis 203 inferior to the half radius of the tank, the outlet of the central nozzle 105 being oriented towards an upper portion 208 of the tank to provide a jet of fluid directed upwardly;
- at least two off-centered nozzles 106*a*, 106*b* arranged on both sides of the said central nozzle 105 such as to create a swirl movement of the said fluid.

The term "peripheral zone within the tank" is generally used herein for a zone inside the tank comprised between the inner wall 210 of the tank 200 and a central zone 207 centered on the central axis 203 of the tank and defined by a radius equal to the half radius of the tank.

The bottom portion 205 of the tank is defined by the portion of the tank under the half height of the tank, preferably the portion under one quarter of height of the tank, more preferably the portion under one eight of the height of the tank.

FIGS. 2 to 7 present various embodiments of the installation according to the invention wherein the pump 101 is arranged outside of the tank 200.

Figure 2:
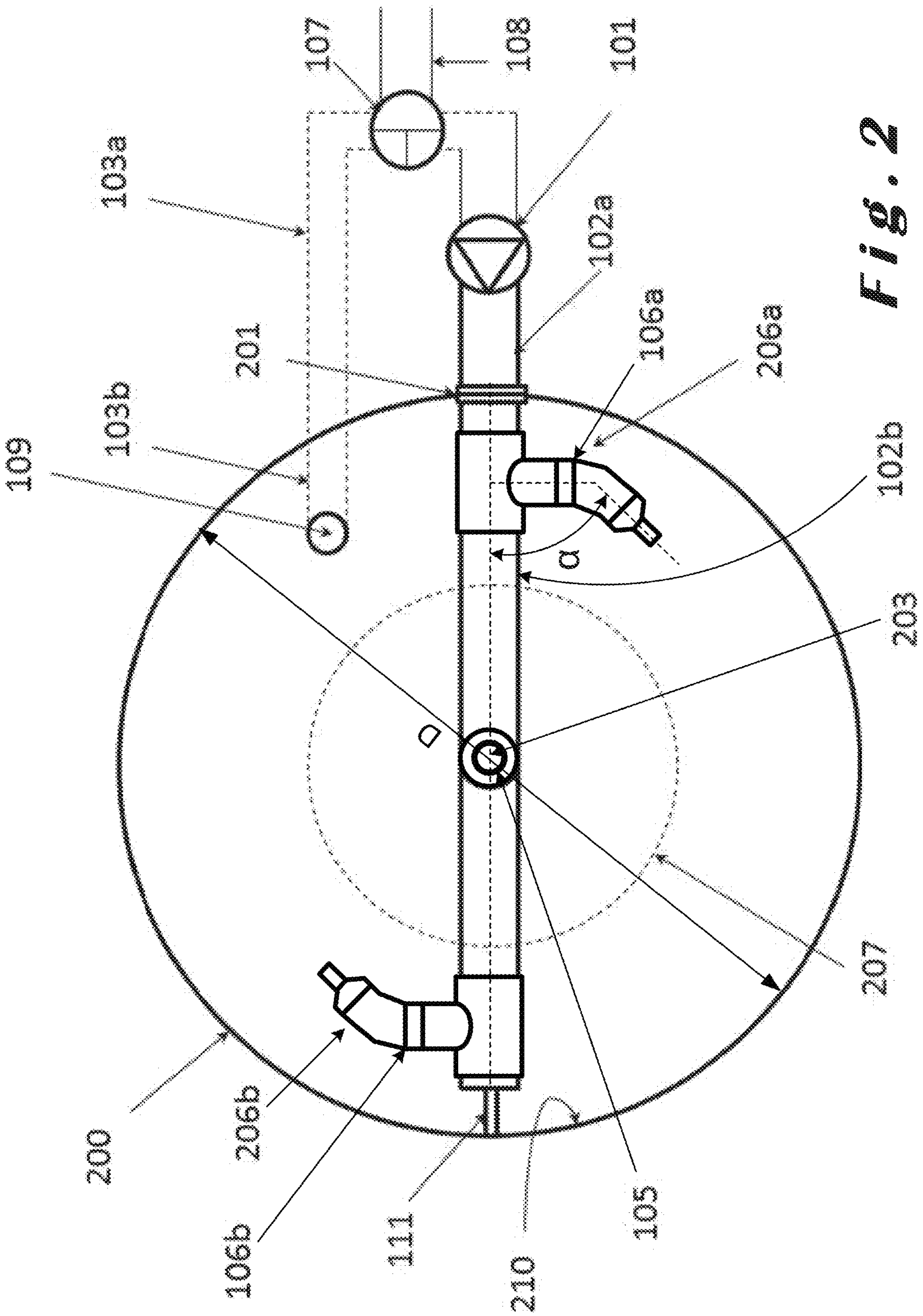
FIG. 2 is a schematic transversal view of an installation according to one embodiment of the invention comprising a tank and a pump arranged outside the tank, the pump being coupled to an injection piping and to a return piping, the injection piping comprising a central nozzle arranged in a central zone of the tank and two off-centered nozzles arranged in a peripheral zone in the tank.

In one embodiment presented with reference to FIG. 2, the pump 101 is coupled to an injection piping 102 and to a return piping 103. The injection piping comprises an outer portion 102*a*, which extends from the pump 101 to a lateral opening 201 of the tank located in a bottom portion 205 of the tank. The injection piping further comprises an inner portion 102*b* which extends into the tank in a bottom portion 205 of the tank 200 from the said lateral opening 201 of the tank, i.e. from a first location of the peripheral zone 206 through a central zone 207 of the tank, preferably through the central axis 203 of the tank, to a second location of the peripheral zone 206, opposite to the first location. Preferably, the inner portion 102*b* of the injection piping 102 extends along a plane orthogonal to the central axis 203 of the tank or along a plane slightly inclined from less than 20°, preferably less than 20°, more preferably less than 5° relative to a plane orthogonal to the central axis of the tank.

The inner portion 102*b* of the injection piping comprises one pipe having a first extremity tightly connected to the lateral opening 201 of the tank for example by welding or through a threaded flange or by a press fit connection fastened on the inner wall 210 of the tank by bolts and screws or welding.

In one embodiment, the inner portion of the injection piping comprises a unique pipe connected by a first extremity to the lateral opening of the tank and extending towards an opposite side of the peripheral zone 206 in the tank wherein a second extremity of the pipe opposite to the first extremity is fastened on the inner wall 210 of the tank for example by welding, threads or pressed against a deformable material such as an elastomeric material. The unique pipe is provided with a central nozzle 105 arranged in the central zone 207 of the tank, preferably coaxially to the central axis 203 with its outlet opening directed towards the upper portion 208 of the tank such as to provide a jet of fluid directed upwards upon action of the pump. The unique pipe is further provided with two off-centered nozzles 106*a* and 106*b* arranged in the peripheral zone 206 on both sides of the central nozzle 105. The off-centered nozzles 106*a*, 106*b* are oriented towards the same circumferential direction along a plane orthogonal to the central axis or inclined upwardly relative to the orthogonal plane such as to provide a swirl movement of the fluid upon action of the pump. More particularly, the off-centered nozzles 106*a*, 106*b*, point in a direction with an angle $\alpha$ between 45° and 80° relative to the axis of the pipe in direction of the center of the tank, i.e. relative to the radial direction of the cylindrical tank. Preferably, the central nozzle 105 and the off-centered nozzles 106*a*, 106*b* are additional pieces fixed to the unique pipe by welding or threading. More preferably, the off-centered nozzles 106*a*, 106*b* extends from the injection piping and have an inner bore shrinking gradually or continuously towards their outlets.

Figure 13B:
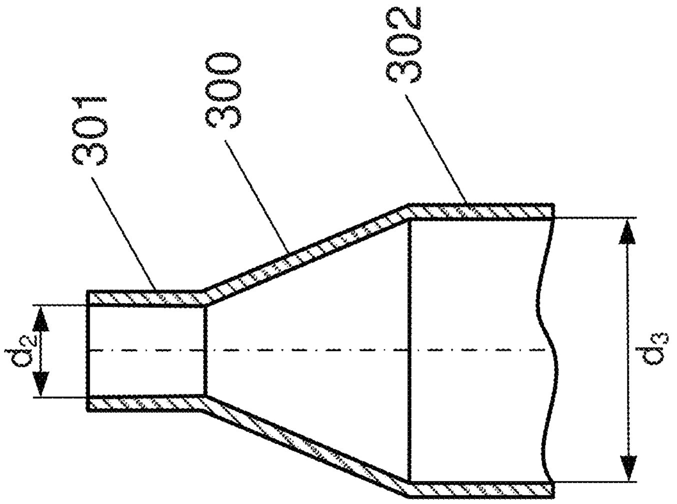
FIGS. 13A and 13B are schematic longitudinal sections, on a larger scale, through a central nozzle and through an off-centered nozzle.
Figure 13A:
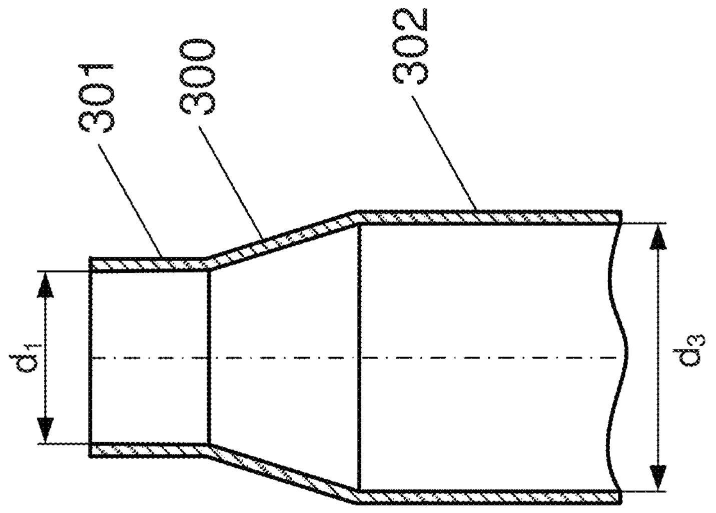

A preferred embodiment of a central nozzle 105, which can be applied in all the different embodiments of the installation, is shown schematically in FIG. 13A. The nozzle comprises a tubular portion 301 which has a constant diameter $d_1$ and which forms the outlet/exit opening of the nozzle. The length of this portion can be selected to achieve a jet of fluid which minimally diverges. It can be quite short but it preferably has a length of some centimeters. The tubular portion 301 is connected via a tapered, preferably a conical portion 300, to a base portion 302 of the nozzle. This base portion of the nozzle is arranged to be connected/fixed to the injection piping. It has an inner diameter $d_3$ which is larger than the inner diameter $d_1$ of the tubular portion 301. Preferably, the inner diameter $d_3$ of the base portion 302 of the nozzle corresponds to the inner diameter of the injection piping onto which it is connected. In this way, and also by the tapered/conical portion 300, which provides for the transition between the base portion 302 and the tubular portion 301, a minimum amount of pressure is lost in the nozzle 105. If present, the tubular portion 301 may also be somewhat tapered, and may have in particular a taper of up to 5° at most, preferably of up to 3° at most.

A preferred embodiment of an off-centered nozzle 106, which can be applied in all the different embodiments of the installation, is shown schematically in FIG. 13B. This embodiment is similar to the embodiment of the central nozzle illustrated in FIG. 13A. The only difference is that the tubular portion 301 has a smaller inner diameter $d_2$. The off-centered nozzle also comprises a tubular portion 301 which has a constant diameter $d_2$ and which forms the outlet/exit opening of the nozzle. The length of this portion can be selected to achieve a jet of fluid which minimally diverges. It can be quite short but it preferably has a length of some centimeters. The tubular portion 301 is connected via a tapered, preferably a conical portion 300, to a base portion 302 of the nozzle. This base portion of the nozzle is arranged to be connected/fixed to the injection piping. It has an inner diameter $d_3$ which is larger than the inner diameter $d_2$ of the tubular portion 301. Preferably, the inner diameter $d_3$ of the base portion 302 of the nozzle corresponds to the inner diameter of the injection piping onto which it is connected. In this way, and also by the tapered/conical portion 300, which provides for the transition between the base portion 302 and the tubular portion 301, a minimum amount of pressure is lost in the nozzle 105. If present, the tubular portion 301 may also be somewhat tapered, and may have in particular a taper of up to 5° at most, preferably of up to 3° at most The return piping 103 is connected to the pump 101 and to the inside of the tank. Preferably, the return piping 103 comprises an inlet 109 arranged at the bottom portion 205 of the tank. The return piping comprises an outer portion 103*a* extending from the pump 101 to an opening of the tank and an inner portion 103*b* extending from the opening of the tank to a bottom portion 205 of the tank.

Figure 3:
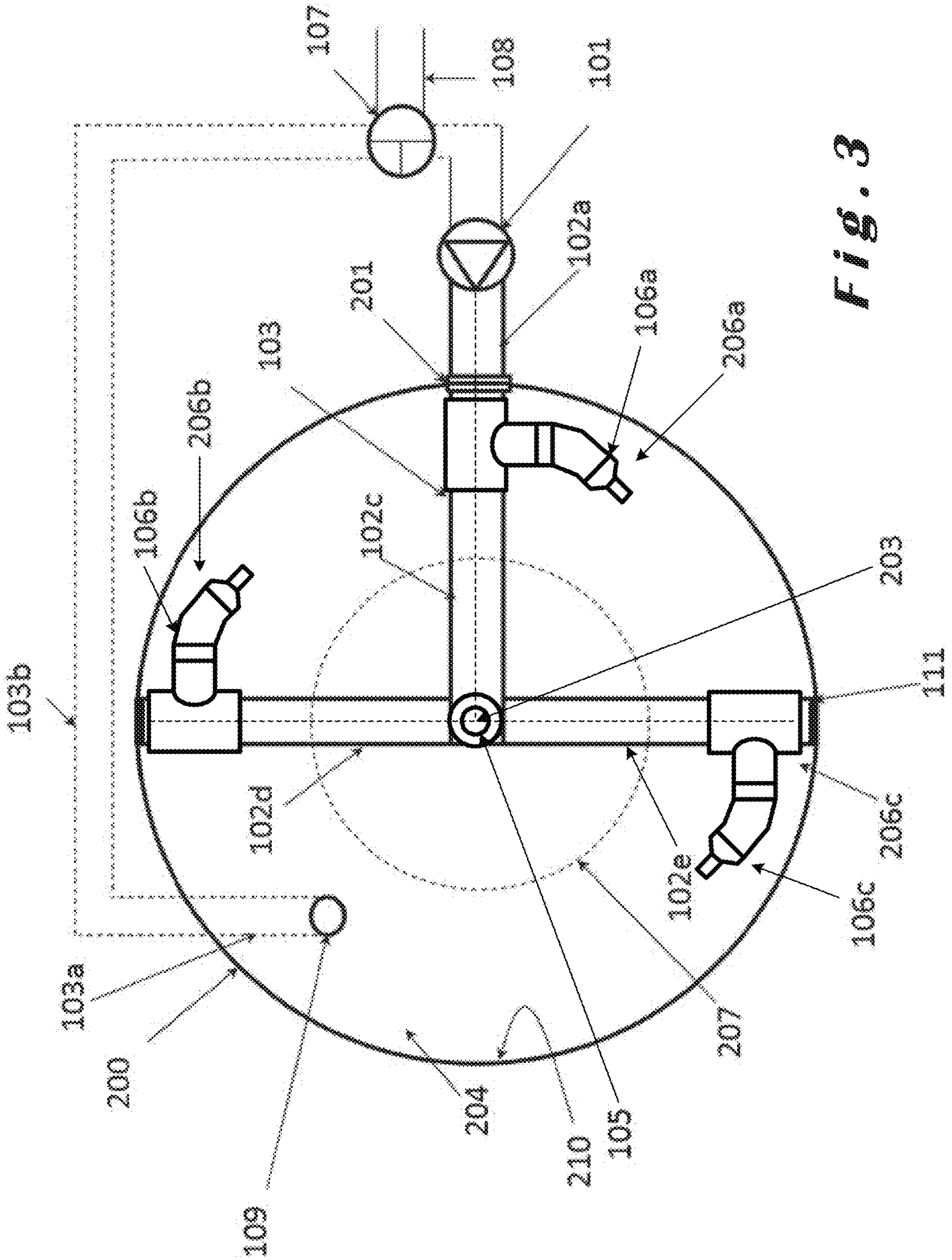
FIG. 3 is a schematic transversal view of an installation according to one embodiment of the invention comprising a tank and a pump arranged outside the tank, the pump being coupled to an injection piping and to a return piping, the injection piping comprising a central nozzle arranged in a central zone of the tank and three off-centered nozzles arranged in a peripheral zone in the tank.

FIG. 3 shows an alternative embodiment of the apparatus wherein the inner portion of the injection piping comprises three pipes 102*c*, 102*d*, 102*e* connected to each other through a tubing connector, for example T-shaped, on which is provided the central nozzle 105. A first pipe 102*c* extends in the bottom portion 205 of the tank from a first extremity connected to the lateral opening 201 of the tank by welding or threads or press fit connection to an opposite extremity connected to the tubing connector. A second pipe 102*d* comprises a first extremity connected to the tubing connector and a second extremity fastened on the inner wall 210 of the tank for example by welding, threads or pressed against a deformable material such as an elastomeric material. A third pipe 102*e* comprises a first extremity connected to the tubing connector and a second extremity fastened on the inner wall 210 of the tank for example by welding, threads or pressed against a deformable material such as an elastomeric material. The first pipe 102*c* is provided with a first off-centered nozzle 106*a*, the second pipe 102*d* is provided with a second off-centered nozzle 106*b* and the third pipe 102*e* is provided with a third off-centered nozzle 106*c*. The off-centered nozzles 106*a*, 106*b*, 106*c* are oriented towards the same circumferential direction along a plane orthogonal to the central axis or inclined upwardly relative to the orthogonal plane such as to provide a swirl movement of the fluid upon action of the pump. More particularly, the off-centered nozzles 106*a*, 106*b*, 106*c* point in a direction with an angle α between 45° and 80° relative to a radius of the tank in direction of the center of the tank. Preferably, the off-centered nozzles 106*a*, 106*b* are additional pieces fixed respectively fastened to the first pipe and second pipe by welding or threading. More preferably, the off-centered nozzles 106*a*, 106*b* extend from the injection piping and have an inner bore shrinking gradually or continuously towards their outlets. The return piping 103 is connected to the pump and to the inside of the tank. The return piping 103 comprises an inlet 109 arranged at the bottom portion 205 of the tank. The return piping comprises an outer portion 103*a* extending from the pump 101 to an opening of the tank and an inner portion 103*b* extending from the opening of the tank to a bottom portion 205 of the tank.

Preferably, for any one of the embodiments presented herein, the central nozzle 105 extends upwardly along a distance relative to the pipe 102*b*, 102*c*, 102*d*, 102*e* of the inner portion of the injection piping of at least 10 cm, preferably of at least 20 cm, more preferably of at least 50 cm, and more preferably up to at least one third of the height of the tank. The central nozzle 105 can extend from the inner piping portion up to a height in the tank relative to the bottom 209 of the tank of at least one quarter of the height of the tank, preferably of at least one third of the height of the tank, in some embodiments up to up to one half of the height of the tank.

Preferably, in any one of the embodiments presented herein, the off-centered nozzles are arranged in a bottom portion 205 of the tank, with their outlet openings preferably at a height relative to the bottom 209 of the tank inferior to 50 cm, preferably inferior to 25 cm, more preferably inferior to 15 cm, and are oriented towards the same circumferential direction. Preferably the off-centered nozzles extend from the pipe of the inner portion of the injection piping to a few centimeters, preferably 30 cm or less, more preferably 20 cm or less, more preferably 10 cm or less. The outlets of the off-centered nozzles 106*a*, 106*b* can have a circular shape or a rectangular shape. Preferably, the off-centered nozzles have a tapered inner bore such as to provide a stronger jet of fluid.

Figure 4:
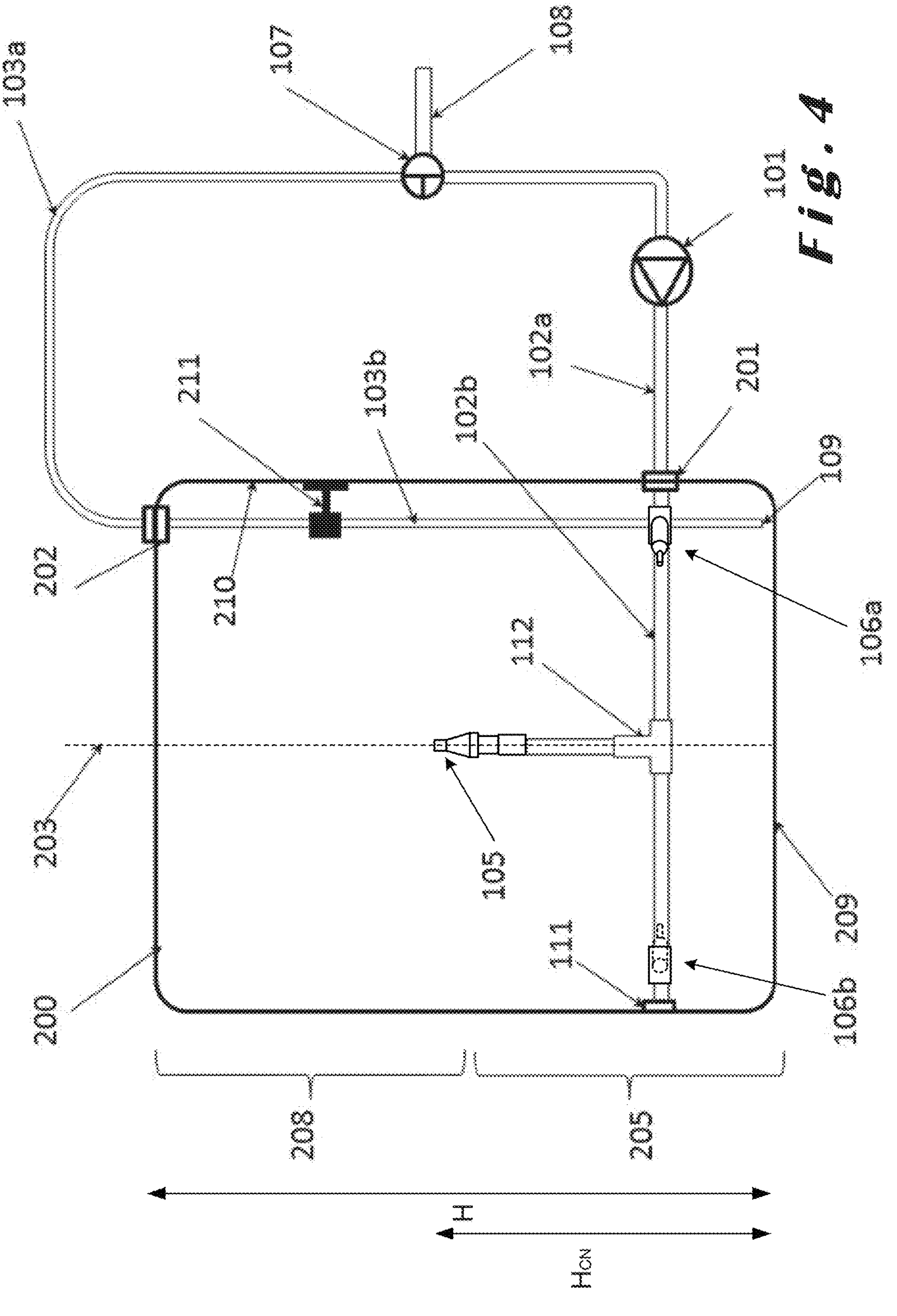
FIG. 4 is a schematic longitudinal view of an installation according to one embodiment of the present invention, comprising a tank and a pump arranged outside the tank and coupled to an injection piping passing through a lateral opening of the tank and to a return piping passing through an upper opening of the tank.

In one embodiment, such as presented in FIG. 4, the tank comprises a lateral opening 201 arranged at a bottom portion of the tank and an upper opening 202. The injection piping comprises an outer portion 102*a* connected to the pump 101 and to the lateral opening 201 of the tank, and an inner portion 102*b* such as described in relation with the FIG. 2. The return piping 103 comprises an outer portion 103*a* connected to the pump 101 and to the upper opening 202 of the tank, and an inner portion 103*b* extending from the upper opening 202 of the tank to a bottom portion 205 of the tank, preferably at a level below the central nozzle 105 and the off-centered nozzles 106*a*, 106*b*, more preferably at a level close to the bottom 209 of the tank.

Preferably, the inner portion 103*b* of the return piping is fixed to the inner wall 210 of the tank and/or to the bottom 209 of the tank through a support means 211 preventing movement of the inner portion of the return piping during the swirl movement of the fluid provided by the off-centered nozzles 106*a*, 106*b* combined to the up and down movement of the fluid provided by the central nozzle 105 upon action of the pump 101.

The injection piping, the tank and the return piping form a flow recirculation path for recirculation of a fluid which can be introduced or removed through an existing opening of the tank, for example through an upper opening.

Preferably, the flow recirculation path comprises a valve 107 connected to the return piping 103 or to the injection piping 102 and connectable or selectively coupled to an external duct 108 for supplying or evacuating the fluid. The valve 107 can be selectively opened for connecting the flow recirculation path to an external duct 108 supplying fluid from an external container such as to introduce a fluid into the tank or such as to evacuate the fluid out of the tank to an external container. The valve can be further selectively closed for closing the flow recirculation path to allow recirculation of the fluid through the flow recirculation path upon action of the pump 101. The external duct 108 can be provided with another pump for facilitating introduction of the fluid into the tank or removal of the fluid out of the tank. An external duct can also be inserted through the upper 202 opening for supplying the tank with fluid or for evacuating the fluid out of the tank.

Figure 5:
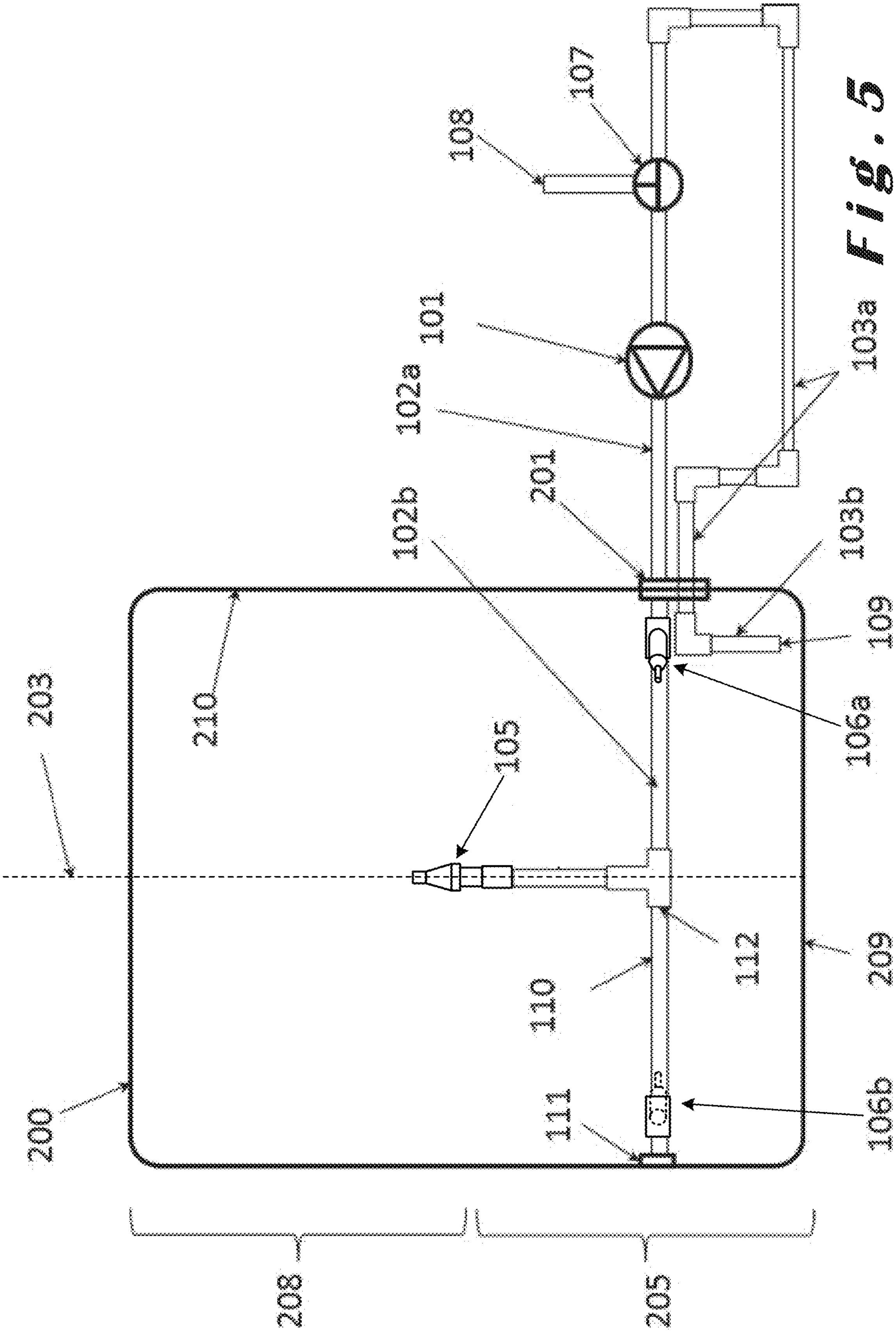
FIG. 5 is a schematic longitudinal view of an installation according to one embodiment of the present invention, comprising a tank and a pump arranged outside the tank, the pump being coupled to an injection piping and a return piping, wherein the injection piping and the return piping pass through a lateral opening of the tank.

FIG. 5 presents an alternative embodiment of the apparatus adapted to be provided to a tank which comprises a lateral opening 201 provided with a flange having two openings for connecting the injection piping and the return piping. The injection piping and the return piping can be tightly connected to the flange through welding, threads or press fit. The injection piping comprises an outer portion 102*a* connected to the pump 101 and to the lateral opening 201 of the tank, and an inner portion 102*b* extending from the said lateral opening 201 inside the tank and comprising a central nozzle 105 and two off-centered nozzles 106*a*, 106*b* such as described in relation with the FIG. 2. In the embodiment presented in FIG. 5, the return piping comprises an outer portion 103*a* extending between the pump 101 and the lateral opening 201 of the tank, and an inner portion 103*b* extending from the opening of the tank 201 to a bottom portion 205 within the tank. Preferably, the return piping has an inlet 109 arranged below the level of the central nozzle 105 and the off-centered nozzles 106*a*, 106*b*. The inlet 109 of the return piping is preferably arranged close to the bottom 209 of the tank.

The flow recirculation path comprises a valve 107 connected to the return piping 103 or to the injection piping 102 and connectable or selectively coupled to an external duct 108 for supplying or evacuating fluid. The valve 107 can be selectively opened for connecting the flow recirculation path to an external duct 108 supplying fluid from an external container such as to introduce a fluid into the tank or such as to evacuate the fluid out of the tank to an external container. The valve can be further selectively closed for closing the flow recirculation path to allow recirculation of the fluid through the flow recirculation path upon action of the pump 101. The external duct 108 can be provided with another pump for facilitating introduction of the fluid into the tank or removal of the fluid out of the tank.

Figure 6:
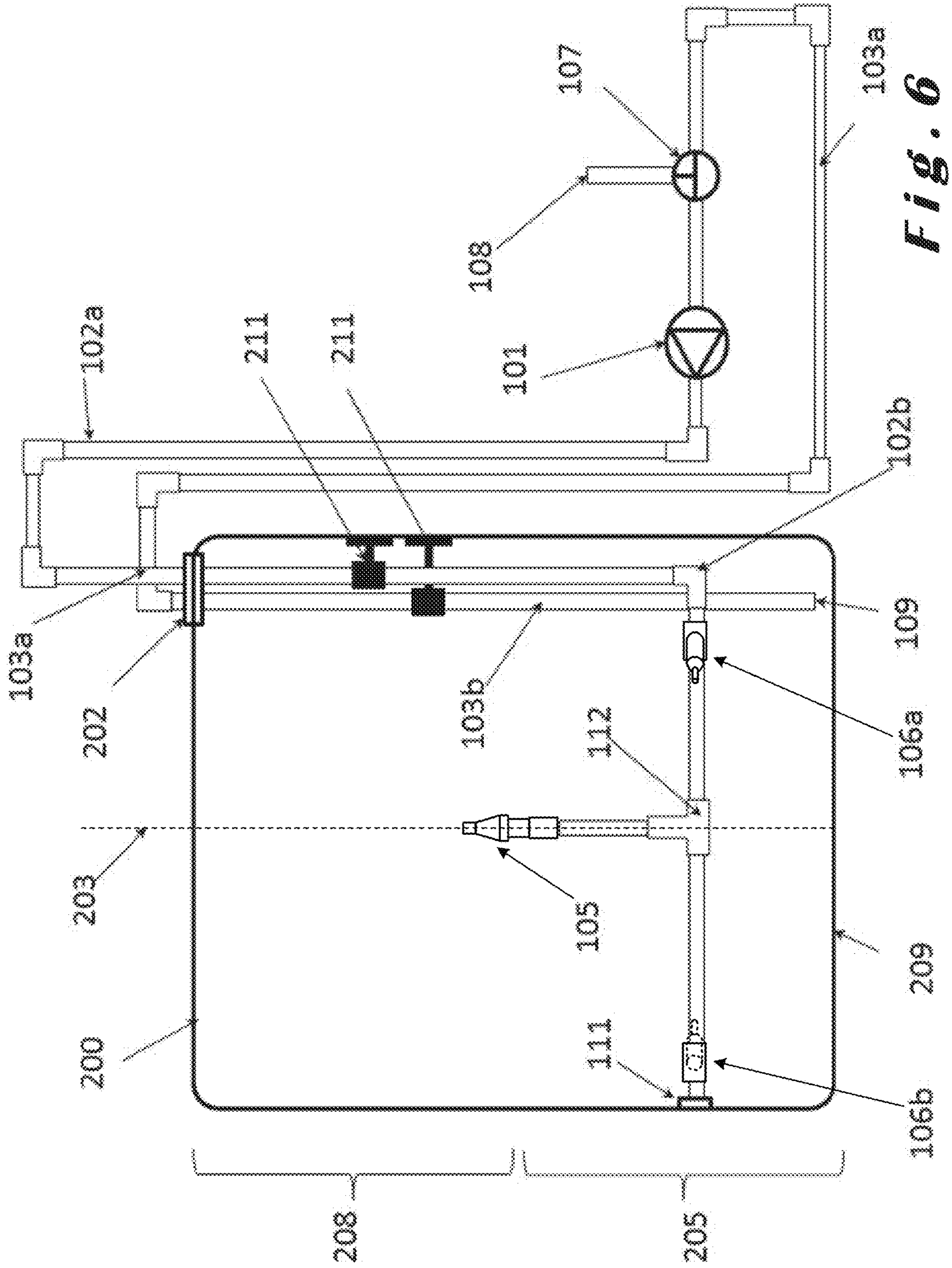
FIG. 6 is a schematic longitudinal view of an installation according to one embodiment of the present invention, comprising a tank and a pump arranged outside the tank and coupled to an injection piping and a return piping passing through an upper opening of the tank.

FIG. 6 shows an alternative embodiment of the apparatus adapted on a tank 200 comprising a single upper opening 202. The injection piping and the return piping extend through this upper opening to a bottom area 205 of the tank. The injection piping comprises an outer portion 102*a* connected to the pump 101 and extending to the upper opening 202, and an inner portion 102*b* extending inside the tank from the upper opening 202 to a bottom portion 205 of the tank and along the bottom portion of the tank from a first location at the peripheral area 206 through the central area 207 to a second location at the peripheral area 206.

In the embodiment presented in relation with FIG. 6, the inner portion 102*b* of the injection piping comprises a first piping portion extending along the height of the tank at a distance relative to the inner wall 210 of the tank preferably inferior to 50 cm, more preferably inferior to 20 cm, more preferably inferior to 5 cm or even positioned against the inner wall of the tank and hold by a support 211 fastened on the inner wall of the tank or alternatively welded to the inner wall of the tank. The first piping portion is connected to a second piping portion through an L-shaped tubing connector in a first location in the peripheral zone 206 and the second piping portion extends from said L-shaped tubing connector through a central zone 207 to a second location in the peripheral zone 206. The second piping portion carries the central nozzle 105 and two off-centered nozzles 106*a*, 106*b* and is fixed to the inner wall 210 of the tank by a fastening means 111.

The return piping comprises an outer portion 103*a* connected to the pump 101 and extending to the upper opening 202 and an inner portion 103*b* extending from the upper opening 202 to a location below the central nozzle 105 and the off-centered nozzles 106*a*, 106*b*.

The flow recirculation path comprises a valve 107 connected to the return piping 103 or to the injection piping 102 and connectable or selectively coupled to an external duct 108 for supplying or evacuating fluid. The valve 107 can be selectively opened for connecting the flow recirculation path to an external duct 108 supplying fluid from an external container such as to introduce a fluid into the tank or such as to evacuate the fluid out of the tank to an external container. The valve can be further selectively closed for closing the flow recirculation path to allow recirculation of the fluid through the flow recirculation path upon action of the pump 101. The external duct 108 can be provided with another pump for facilitating introduction of the fluid into the tank or removal of the fluid out of the tank. An external duct can also be inserted through the upper 202 opening for supplying the tank with fluid or for evacuating the fluid out of the tank.

Figure 7:
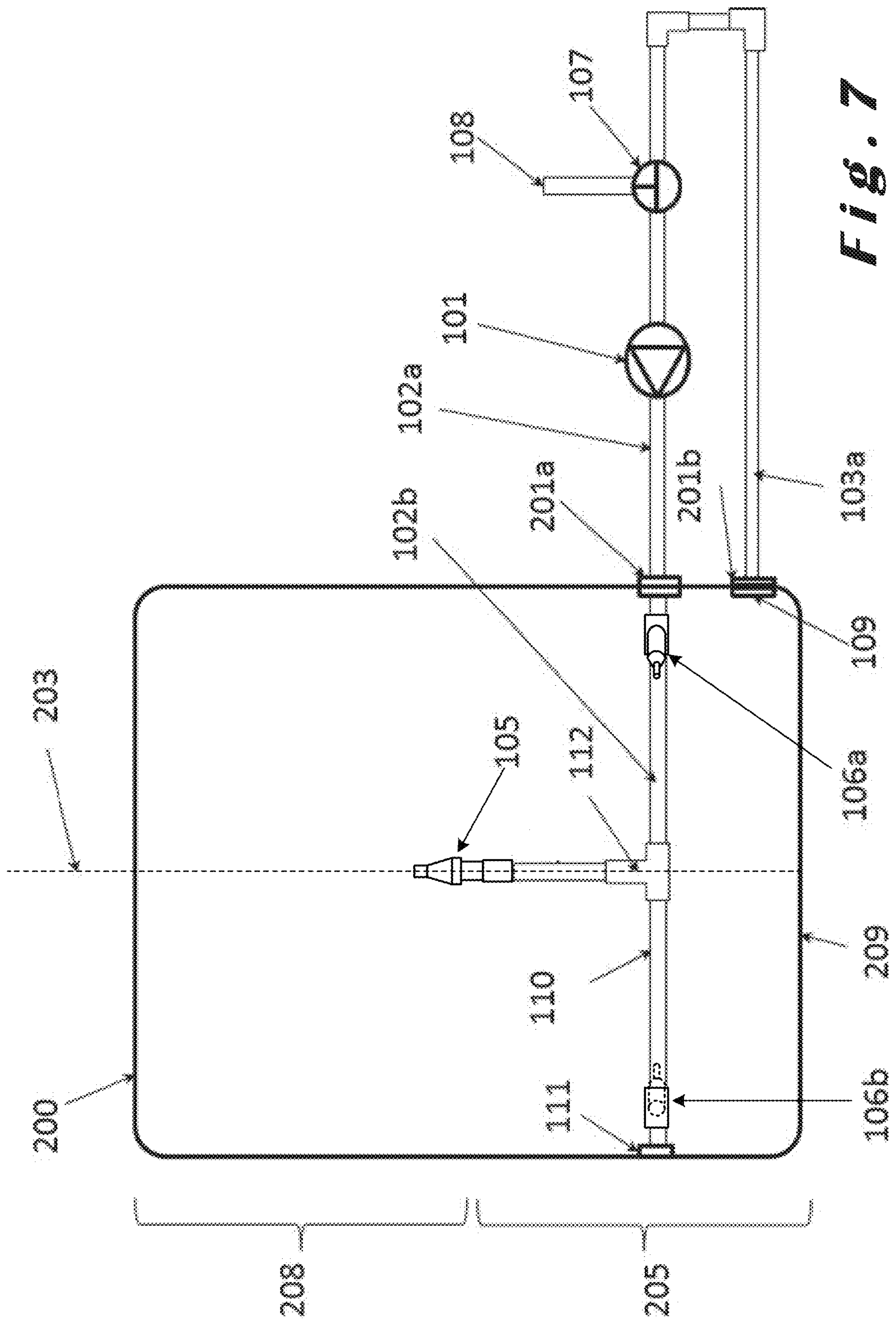
FIG. 7 is a schematic longitudinal view of an installation according to one embodiment of the present invention, comprising a tank and a pump arranged outside of the tank and coupled to an injection piping and a return piping passing through a first lateral opening of the tank, and to a return piping connected to a second lateral opening of the tank.

FIG. 7 shows another alternative embodiment of the apparatus according to the present invention, wherein the apparatus is provided on a tank comprising two lateral openings. The apparatus comprises an injection piping comprising an outer portion 102*a* extending from the pump 101 to a first lateral opening 201*a* and an inner portion 102*b* extending in a bottom portion 205 of the tank such as presented in relation with FIG. 2 and FIG. 4. The return piping 103*a* is connected to the pump 101 and to the second lateral opening 201*b* positioned below the first lateral opening 201*a*, preferably the closest as possible to the bottom 209 of the tank.

The flow recirculation path comprises a valve 107 connected to the return piping 103 or to the injection piping 102 and connectable or selectively coupled to an external duct 108 for supplying or evacuating fluid. The valve 107 can be selectively opened for connecting the flow recirculation path to an external duct 108 supplying fluid from an external container such as to introduce a fluid into the tank or such as to evacuate the fluid out of the tank to an external container. The valve can be further selectively closed for closing the flow recirculation path to allow recirculation of the fluid through the flow recirculation path upon action of the pump 101. The external duct 108 can be provided with another pump for facilitating introduction of the fluid into the tank or removal of the fluid out of the tank. An external duct can also be inserted through the upper 202 opening for supplying the tank with fluid or for evacuating the fluid out of the tank.

Figure 8:
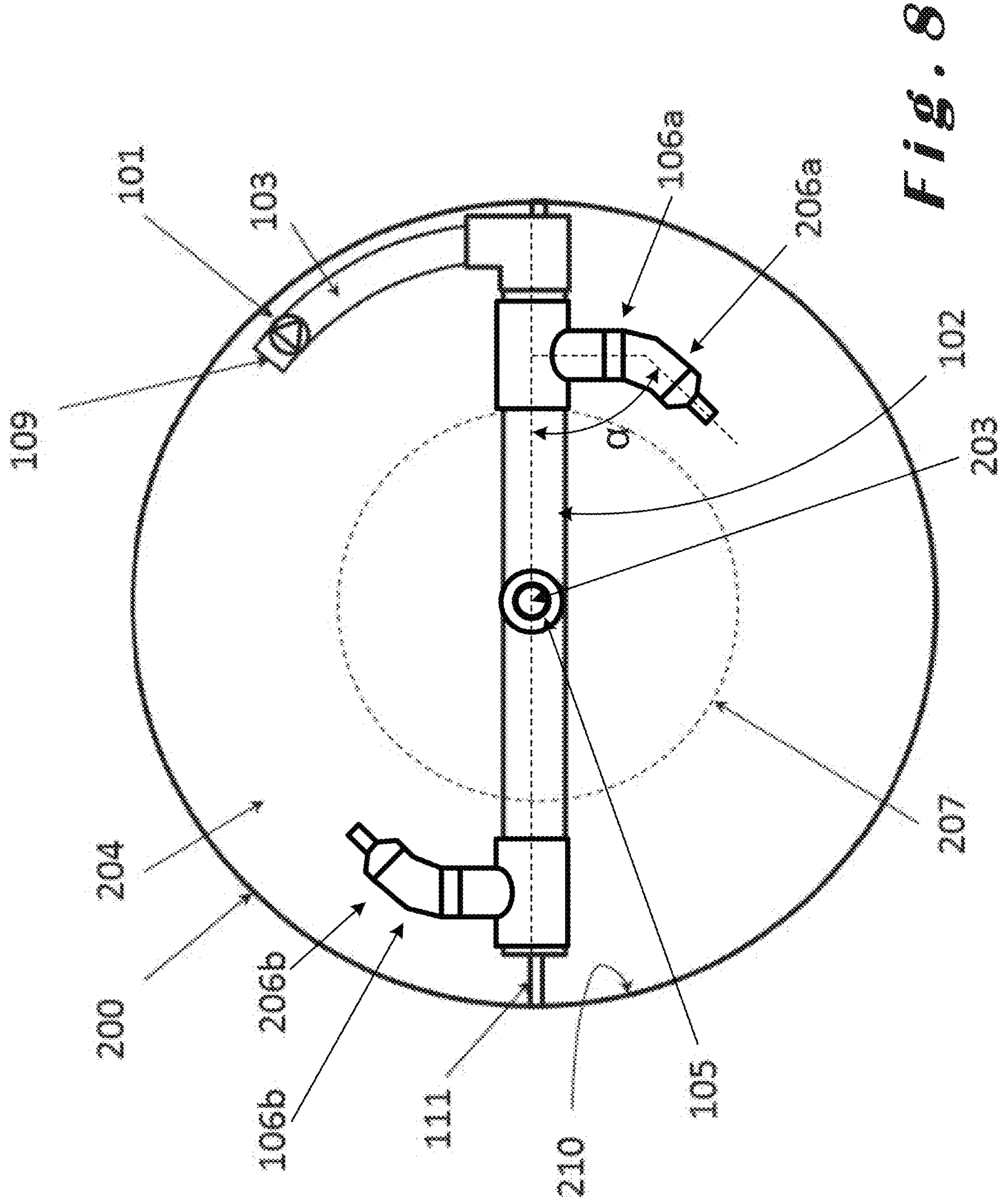
FIG. 8 is a schematic transversal view of an installation according to one embodiment of the invention comprising a tank and a submersible pump arranged into the tank and coupled to a return piping and an injection piping, wherein the return piping and the injection piping are fully enclosed into the tank, the tank comprising another opening (not shown) for supplying fluid into the tank.
Figure 9:
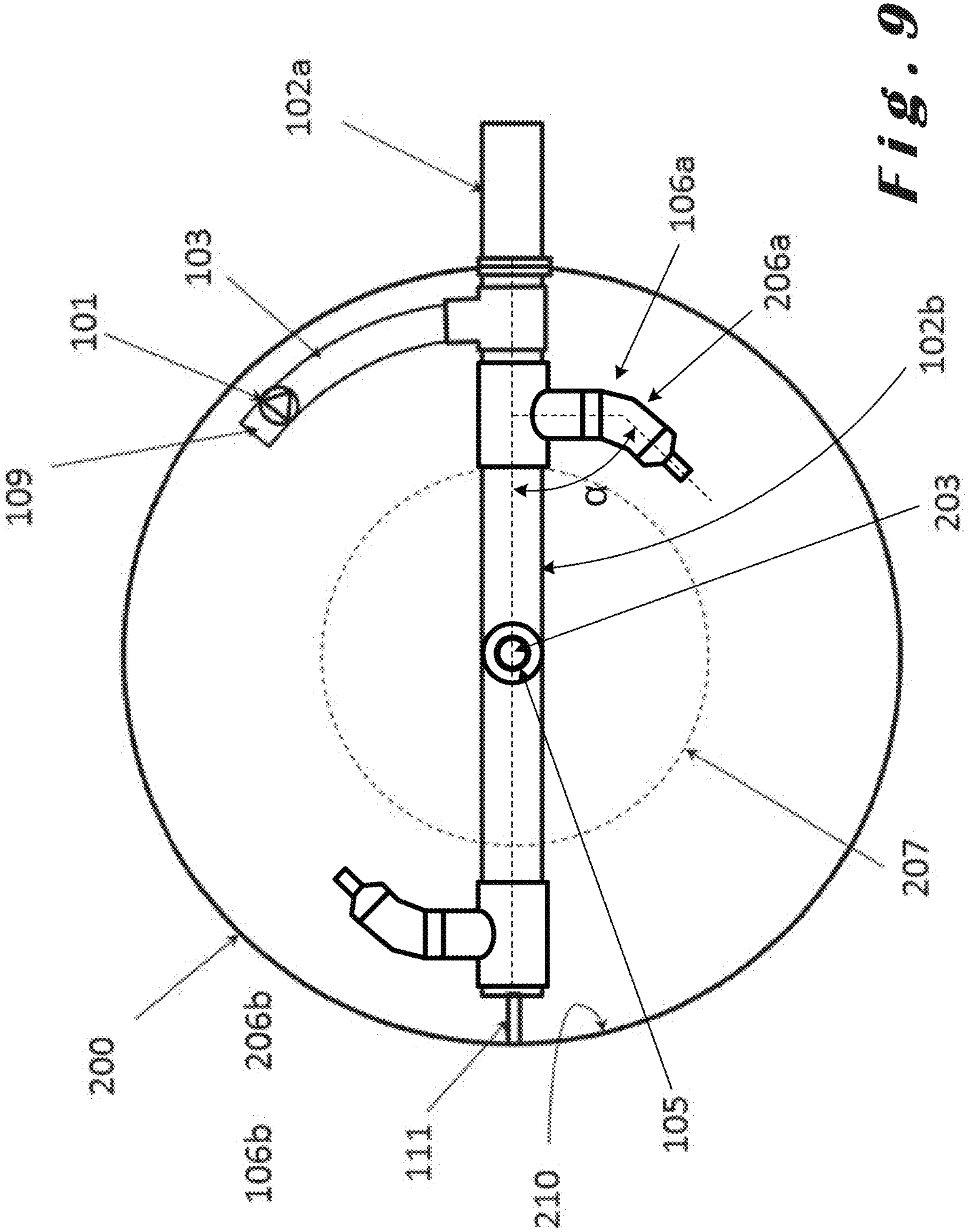
FIG. 9 is a schematic transversal view of an installation according to one embodiment of the invention comprising a tank and a submersible pump arranged into the tank and coupled to a return piping and an injection piping, wherein the return piping is fully enclosed into the tank and the injection piping is partially enclosed into the tank, passes through a lateral opening of the tank and can be selectively coupled or uncoupled to an external duct for providing fluid into the tank.

FIGS. 8 and 9 show alternatives embodiments of an apparatus according to the present invention, wherein the pump 101 is located inside the tank. The pump 101 can be a submersible pump preferably connected to the return piping 103. The return piping 103 is connected to the injection piping 102 which has its both extremities fixed to the inner wall of the tank. In the embodiment presented in FIG. 8, the tank has an opening located at the top or alternatively at a lateral side of the tank (not shown) and fluid can be pumped through this opening for supplying the fluid into the tank or of evacuating the fluid. In the embodiments presented in FIG. 9, the injection pipe has an inner portion 102*b* connected to the return piping 103 and to a lateral opening 201 at the bottom of the tank and to an outer piping portion 102*a* which can be selectively closed or opened and connectable to an external duct for providing fluid into the tank or for evacuating fluid out of the tank.

In any of the embodiment presented above, it is preferable that the inlet 109 of the return piping is arranged in the circumferential direction of the off-centered nozzles at a distance from the central nozzle 105 and from the off-centered nozzles 106*a*, 106*b* superior or equal to the half radius of the tank.

In any of the embodiment presented above, it is preferable that the off-centered nozzles are positioned at a minimum distance relative to the inner wall, preferably of at least 2 cm, more preferably at least 5 cm.

In any of the embodiments presented above, the central nozzle 105 has preferably an outlet opening having a surface area superior to the sum of the surface areas of the outlet openings of the off-centered nozzles 106*a*, 106*b*.

In any of the embodiments presented above, the off-centered nozzles have preferably a tapered portion with an inner bore decreasing towards their openings.

In any of the embodiments, the piping assembly of the apparatus can be made of a metals such as stainless steel or made of plastic such as PVC (polyvinyl chloride) or any suitable material resistant to corrosion known by the skilled person.

Preferably, the tank has a cylindrical shape with a height greater than the diameter of the tank. The tank can be an existing tank of a plant initially destined to store a first liquid which does not require substantial mixing and which is converted for storing another liquid requiring substantial homogenization, such as a milk of lime, a milk of dolime, a suspension of alkaline earth metal carbonates or any other suspension with a solid content which requires homogenization before use in a specific application.

The present invention also provides a method for recirculating and homogenizing a fluid in a tank having at least one opening, a central axis, a radius, and a height greater than its radius, preferably greater than twice the radius comprising the steps of:

i) providing to the tank an injection piping and a return piping to form a flow recirculation path;
ii) coupling an external duct to the said flow recirculation path for supplying said fluid into the tank;
iii) filling the said tank with said fluid;
iv) uncoupling the said external duct from the flow recirculation path; and
iv) pumping the said fluid from the return piping to the injection piping wherein the injection piping is designed such as to reinject the fluid in at least two peripheral bottom locations with an horizontal and/or inclined orientation such as to create a swirl movement in the tank and such as to reinject simultaneously said fluid upwardly through a central location in a zone comprised between the central axis of the tank and the half radius of the tank such as to create a jet of fluid having a main vertical component.

Preferably, the method further comprises a step of diverting the fluid to an external container through the said duct.

Preferably, the said fluid is recirculated and mixed during at least 30 minutes per day.

In one embodiment, the said fluid does not need to be recirculated and mixed for more than 4 hours per day.

In the method, the said fluid is a shear thinning fluid such as milk of lime, a milk of dolime, a suspension of alkaline earth metal carbonates or any other suspension with a solid content which requires homogenization before use in a specific application.

The present invention is especially directed to a method for homogenizing a shear thinning fluid, for example milk of lime or milk of dolime, in a cylindrical tank. This tank has not the usual dimensions for optimally enabling to stir such a shear thinning liquid, in particular since it has a height H which is greater than the inner diameter D of the tank. The height H is the inner height of the tank up to which the tank can be filled with the fluid. The inner diameter D is the average diameter. In case the tank is not entirely cylindrical, it can be calculated starting from the internal volume of the tank divided by the height H to achieve the average cross-sectional inner surface area of the tank. The average diameter D is then the diameter of a circle having this surface area.

The installation of the present invention comprises only one central nozzle 105, which has only one outlet opening. This means that in the method according to the present invention only one upwardly directed jet of fluid is produced. The energy provided by the pump 101 to create the vertical swirl movement in the tank is thus concentrated in one single, and thus powerful upward jet.

EXAMPLES

Simulations

Comparative Example 1

Figure 10:
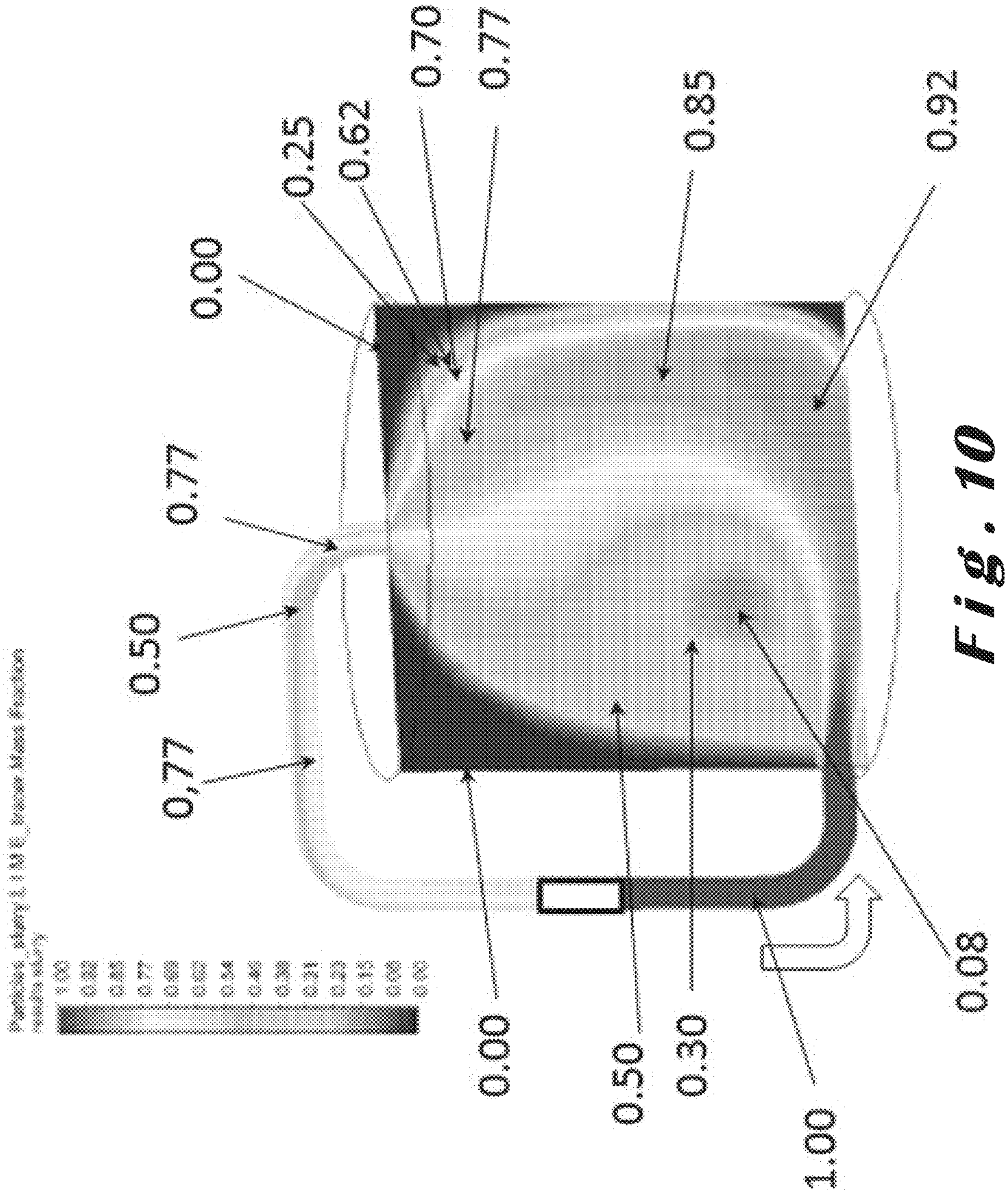
FIG. 10 shows a simulation of the behavior of a milk of lime under mixing in the tank in a view according to a longitudinal plane of a tank, wherein the tank is equipped with a comparative embodiment of an apparatus for mixing a fluid in the tank, the apparatus comprising a pump coupled to an injection pipe extending from the pump to a lateral opening at the bottom of the tank and a return pipe extending from a top opening of the tank to the pump, the upper opening being coaxial to the central axis of the tank.

FIG. 10 shows a simulation of the behavior of a milk of lime under mixing in the tank in a view according to a longitudinal plane passing through the central axis of the tank. The tank is equipped with a comparative embodiment of an apparatus for mixing a fluid in the tank, the apparatus comprising a pump coupled to an injection pipe extending from the pump to a lateral opening at the bottom of the tank and a return pipe extending from a top opening of the tank to the pump, the upper opening being coaxial to the central axis of the tank. The tank has a height of 3 meters and a radius of 1.524 m, the injection piping and the return piping have an inner diameter of 21 cm. The pump has a mean velocity of the fluid at the outlet of the pump is set at 0.3 m/s. The simulation starts when the system is at rest. A tracer marker is provided at the level of the pump and the pump generates a continuous flow and marks the particle phase with index 1. FIG. 10 shows a view of the distribution of the tracer marker after 30 minutes of simulated recirculation of milk of lime. As it can be seen some important zones at the top edges of the tank and in the middle of the tank shows an index close to zero which means there is almost no fluid circulation in these zones and therefore a bad homogeneity of the solid content of the milk of lime within the tank.

Figure 11:
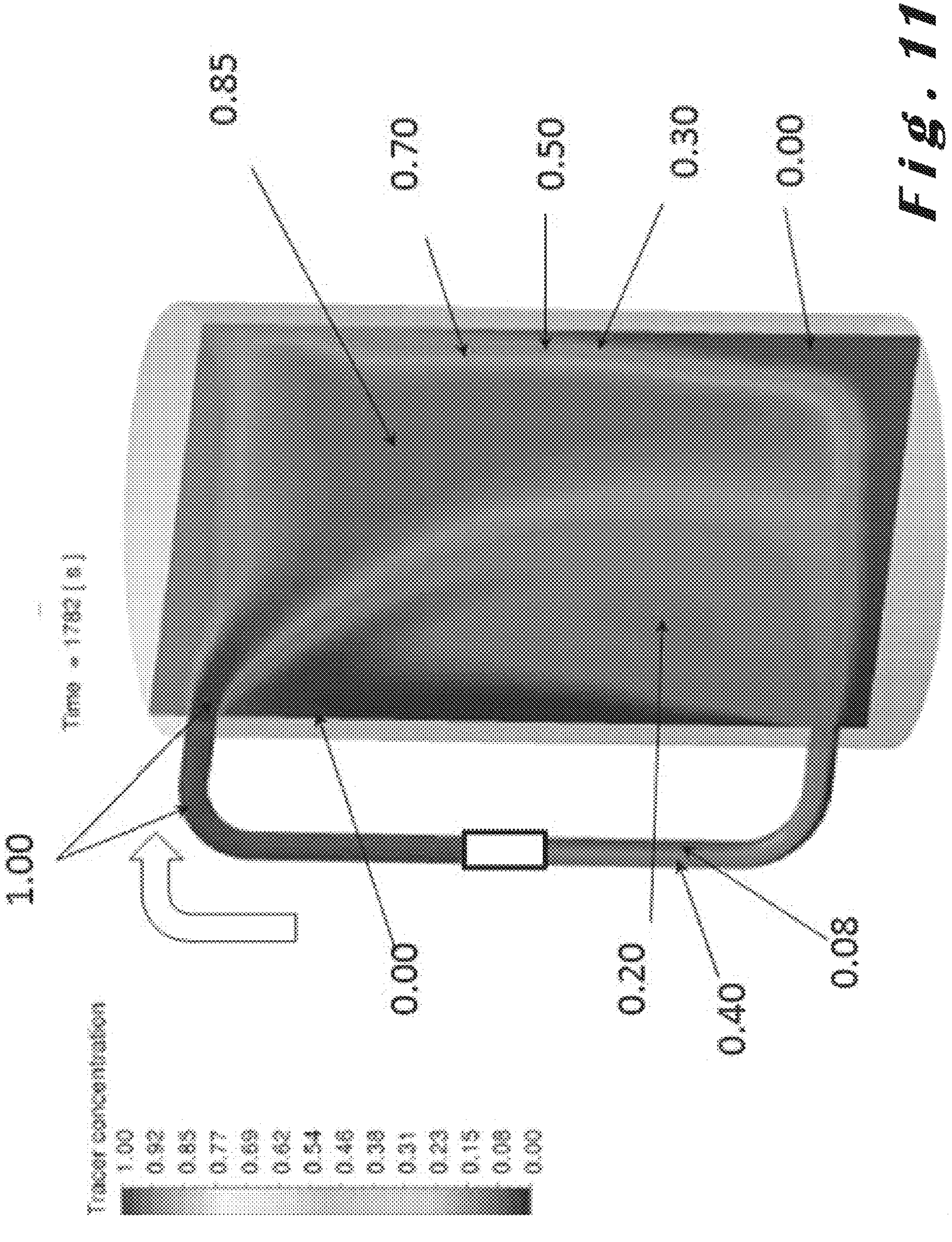
FIG. 11 shows a simulation of the behavior of a milk of lime under mixing in a tank in a view according to a longitudinal plan of the tank, wherein the tank is equipped with another comparative embodiment of an apparatus for mixing a fluid in the tank, the apparatus comprising a pump coupled to an injection pipe extending from the pump to a lateral opening at the top of the tank and a return pipe extending from an bottom lateral opening of the tank to the pump.

FIG. 11 shows a simulation of the behavior of a milk of lime under mixing in a tank in a view according to a longitudinal plan of the tank passing through the central axis. The tank is equipped with another comparative embodiment of an apparatus for mixing a fluid in the tank, the apparatus comprising a pump coupled to an injection pipe extending from the pump to a lateral opening at the top of the tank and a return pipe extending from a bottom lateral opening of the tank to the pump. The tank has a height of 5 meters and a diameter of 1.524 m, the injection piping and return piping have an inner diameter of 21 cm and the pump has flow rate at the outlet of the pump set to 170 gal/min (0.64 $m^3$/min). FIG. 11 shows a view of the distribution of the tracer marker after 30 minutes of simulated recirculation of milk of lime. As it can be seen some important zones at the bottom of the tank shows an index close to zero which means there is no fluid circulation in that zone, with the consequence that the solid can sediment and more likely can cause blocking the opening of the return piping.

Figure 12:
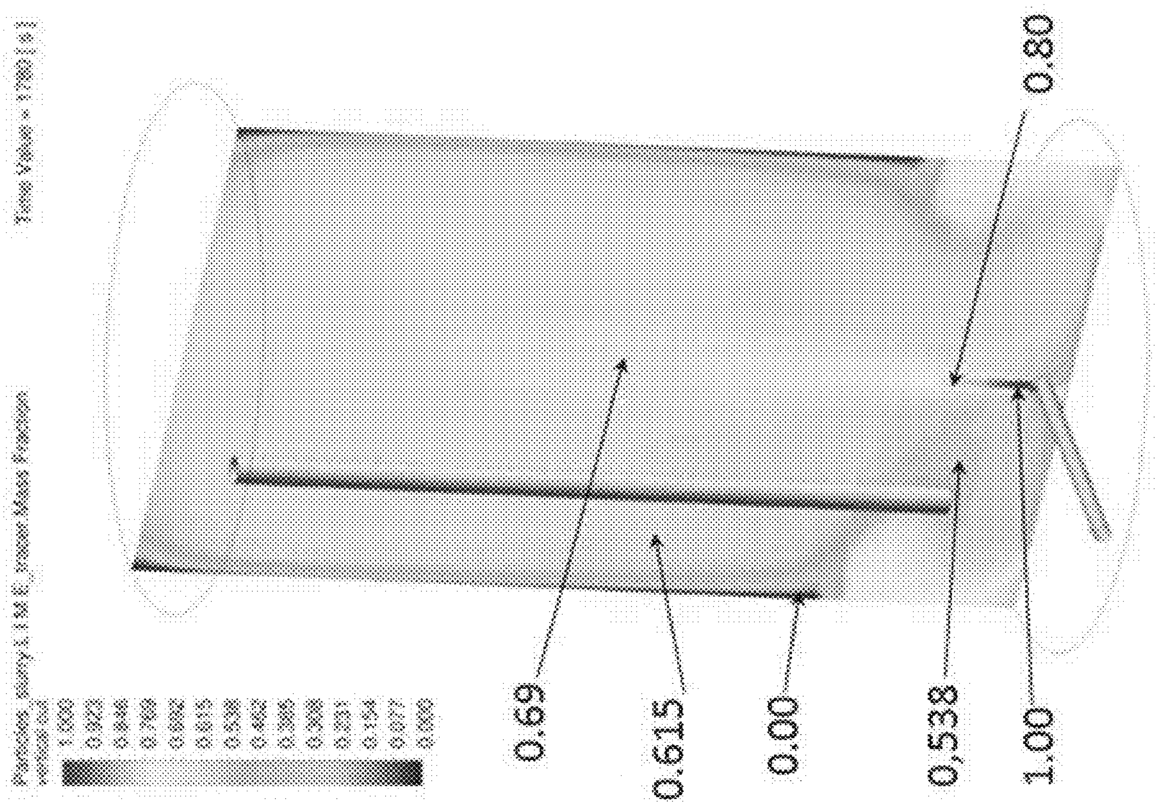
FIG. 12 shows a simulation of the behavior of a milk of lime under mixing in a tank equipped with an apparatus according to an embodiment of the invention, in a view according to a longitudinal plane of the tank.

FIG. 12 shows a simulation of the behavior of a milk of lime under mixing in an installation according to an embodiment of the invention, in a view according to a longitudinal plane passing through the central axis of the tank. The tank has a height of 5 meters and a diameter of 1.524 m, the injection piping has an inner diameter of 4" (10.2 cm), the return piping has an inner diameter of 6" (15.2 cm) and the pump has a flow rate at the outlet of the pump set to 170 gal/min (0.64 $m^3$/min). The off-centered nozzles have an outlet diameter of 2" (5.1 cm) and the central nozzle has an outlet diameter of 2.83" (7.2 cm). The flow rate through each off-centered nozzles is set to 5000 gal/h (0.32 $m^3$/min) and the flow rate through the central nozzle is set to 10,000 gal/h (0.64 $m^3$/min). FIG. 12 shows a view of the distribution of the tracer marker after 30 minutes of simulated recirculation of milk of lime. As it can be seen, the tracer marker index presents very small variation within the volume of the tank, excepted at very small locations close to the inner wall at about a fifth of the height of the tank. There is no deposit in the bottom of the tank and a good fluid circulation across the whole volume of the tank.

These results highlight that according to the invention, the injection piping presenting a central nozzle for injecting the fluid from the bottom to the top of the tank and at least two off-centered nozzles oriented such as to create a swirl movement in the tank allows to create a jet of fluid having a main vertical component in which the particles in suspension are well homogenized across the whole volume of the tank.

Practical Examples

An apparatus according to the embodiment presented in relation with FIGS. 2 and 4 has been provided to a tank 200 having a capacity of 5000 gal (18.9 $m^3$) comprising an upper opening 202 and a lateral opening 201. The tank 200 had a height of 147" (3.73 m) and a diameter of 100" (2.54 m). The apparatus according to the invention had an injection piping and return piping having an inner diameter of 4" (10 cm). The injection piping was arranged along a plane orthogonal to the central axis of the tank and carried a central nozzle 105 extending coaxially relative to the central axis 203 of the tank. The top of the nozzle was located at 48" (1.21 m) from the bottom 209 of the tank. The outlet of the central nozzle 105 had a diameter of 2.6" (5.1 cm). A first off-centered nozzle 106*a* forming an angle of 70° with the longitudinal axis of the injection piping, i.e. with the radial direction of the tank, and having an outlet located at 13" (33.0 cm) from the inner wall 209 of the tank was located in a first peripheral zone 206*a*, and a second off-centered nozzle 106*b* forming an angle of 70° with the radius of the tank 200 and having an outlet located at 17" (43.2 cm) from the inner wall 209 of the tank was located in a second peripheral zone 206*b*, opposite to the first peripheral zone 206*a*. The outlets of the two off-centered nozzles 106*a*, 106*b* had a diameter of 1.4" (2.5 cm). The outlet openings of the off-centered nozzles 106*a*, 106*b* were located at a height of less than 15 cm above the bottom of the tank. The inlet of the return piping was arranged at a lower height, more particularly at 3.5" (8.9 cm) from the bottom 210 of the tank.

In order to measure the homogenization of the milk of lime, a plurality of ports were machined at various heights of the tank such as to take samples of the milk of lime and measuring the solid content at various heights of the tank. The solid content of the samples were measured by LOD (loss on drying) at 150° C. until constant weight.

A volume of 4726 gal (17.9 $m^3$) of a milk of lime having a solid content of about 43.7 wt. % in weight of the milk of lime was transferred from a container to the tank 200 through an external duct 108 passing through the upper opening of the tank. The milk of lime was left to settle for 17 hours. Samples were taken at various heights of the tank, and samples taken at a height of 123" (3.12 m) and at a height of 99" (2.51 m) had a difference of solid content of more than 2% lower relative to the samples taken at a height of 3" (7.6 cm). Then, the pump 101 was actuated and set to 260 gal/min (0.984 $m^3$/min) for recirculating the milk of lime through the flow recirculation path formed by the injection piping, the tank and the return piping. Samples were taken periodically at different heights of the tank and it was seen after 150 minutes that the difference of solid content between the samples taken at top of the tank and the samples taken at the bottom of the tank was reduced to less than 0.5%.

The pump was switched off and the same milk of lime was left to settle for 3 days in the same tank. The solid content was measured at various height of the tank. A sample taken at a height of 139" (3.53 m) showed 0 wt. % of solid content and a sample taken at 3" (7.6 cm) from the bottom of the tank had a solid content of 47 wt. %. Then the pump was switched on with the same flow rate of 260 gal/min (0.984 $m^3$/min), and samples were taken periodically at various heights. Only after 15 minutes of mixing by recirculation through the flow recirculation path, the samples taken at a height of 139" (3.53 m) showed a solid content of 42.2 wt. %, and the difference of solid content between the samples taken at a height of 139" (3.53 m) and the samples taken at 3" (7.6 cm) decreased to less than 5 wt. %. After two hours of mixing by recirculation, the difference of solid content between the samples taken at a height of 139" (3.53 m) and the samples taken at 3" (7.6 cm) decreased to less than 2 wt. %.

In these two examples, the height difference between the top of the tank and the location of the outlet opening of the central nozzle was equal to 252 cm. The total flow rate (in ml/sec) divided by the total surface area (in $cm^2$) of the outlet openings of the central nozzle and the off-centered nozzles was equal to about 303 cm/sec. This value is greater than the height difference of 252 cm and an efficient homogenization of the fluid was achieved.

The above example was repeated, with milk of lime that was allowed to settle for 22, the flow rate was however reduced to 220 gal/min. The total flow rate (in ml/sec) divided by the total surface area (in $cm^2$) of the outlet openings of the central nozzle and the off-centered nozzles was equal to about 256 cm/s. As the central nozzle and the off-centered nozzles are provided on the same injection piping, this value corresponds substantially to the velocity of the fluid which is ejected out of the central nozzle. In this case, it was possible to homogenize the milk of lime but it took more than 3 hours to homogenize it within a variation of 5% above and below the average solid content of the milk of lime.

Further tests were done with bigger tanks, namely with cylindrical tanks of 10000 and 12690 gallon, having respectively a height of 610 cm and 457 cm, and a diameter of 290 cm and 366 cm. The 10000 gallon tank was equipped with a same injection system, with two off-centered nozzles, whilst the 12690 gallon tank was equipped with an injection system with two additional off-centered nozzles. The sizes of the central nozzle and of the off-centered nozzles were always the same as in the previous examples. In the 10000 gallon tank, the central nozzle was situated at a height of 201 cm above the bottom of the tank whilst in the 12690 gallon tank it was situated at a height of 152 cm above the bottom.

Different tests were done. For the 10000 gallon tank a total flow rate of 360 gal/min, corresponding to a velocity of the fluid leaving the central nozzle of about 420 cm/sec, enabled an efficient homogenization of the milk of lime. A flow rate of 260 gal/min, corresponding to a velocity of about 303 cm/sec (which is less than the 409 cm height difference), did however not enable an efficient mixing of the milk of lime.

The installation according to the present invention represents a simple solution for converting an existing tank initially destined for storage of a Newtonian liquid into a tank for storage of a non-Newtonian, more particularly shear-thinning, fluid such as milk of lime, a milk of dolime, a suspension of carbonates or any other suspension with a solid content which requires homogenization before use in a specific application.

The installation according to the present invention is further cost effective as it does not require expensive components or replacement of an existing tank.

The installation according to the present invention provides efficient mixing and homogenization of high solid content milk of lime (i.e. milk of lime having a solid content up to 45 wt. %) with reduced power consumption.

The milk of lime or of dolime homogenised in the installation of the present invention has preferably an average solid content of more than 5 wt. %, more preferably of more than 10 wt. % and most preferably of more than 15 wt. %.

The invention claimed is:

1. A method for homogenizing a shear thinning fluid contained in a cylindrical tank by pumping said fluid via a return piping out of said tank and via an injection piping back into said tank, which tank has a central axis, a radius, an internal volume and a height up to which the tank can be filled with said fluid which is greater than twice the radius of the tank, which method comprises the steps of:

producing an upwardly directed jet of said fluid in said tank by means of one central nozzle provided on said injection piping and having one outlet opening for producing said jet, which outlet opening is directed upwards and passes through the central axis of the tank or is arranged at a distance from said central axis which is smaller than half said radius; and creating a swirl movement of said fluid in a bottom portion of the tank by means of at least two off-centered nozzles provided on said injection piping and each having one outlet opening for producing said swirl movement, the outlet openings of the off-centered nozzles being positioned in two peripheral bottom locations within the tank, wherein said fluid comprises milk of lime, milk of dolime and/or a suspension of alkaline earth metal carbonates.

2. The method as claimed in claim 1, wherein said jet of fluid is formed by means of said central nozzle which has a tapered portion.

3. The method as claimed in claim 2, wherein said jet of fluid is formed by means of a tubular outlet portion of said central nozzle, which tubular outlet portion is connected by said tapered portion to said injection piping.

4. The method as claimed in claim 3, wherein the tubular outlet portion of the central nozzle has an inner bore having a substantially constant inner diameter.

5. The method as claimed in claim 1, wherein said swirl movement of said fluid is created by means of said at least two off-centered nozzles which each have a tapered portion.

6. The method as claimed in claim 5, wherein said swirl movement of said fluid is created by means of a tubular outlet portion of each of said off-centered nozzles, which tubular outlet portion is connected by said tapered portion to said injection piping.

7. The method as claimed in claim 6, wherein the tubular outlet portions of the off-centered nozzles have an inner bore having a substantially constant inner diameter.

8. The method as claimed in claim 1, wherein said fluid is supplied at a predetermined total flow rate ($F_{tot}$) to said central nozzle and to said off-centered nozzles which is at least equal to 1.75 times the internal volume (V) of said tank per hour.

9. The method as claimed in claim 1, wherein said fluid is supplied at a predetermined flow rate ($F_{CN}$) to said central nozzle, the outlet opening of which has a predetermined surface area ($A_{CN}$) and is located at a predetermined height ($H_{CN}$) in said tank, which tank is arranged to be filled with said fluid at most up to the height (H) thereof, with said predetermined flow rate ($F_{CN}$) of the fluid supplied to said central nozzle being defined by the following formula:

$$\frac{F_{CN}}{A_{CN}} \geq (H - H_{CN})/\text{sec},$$

wherein:

$F_{CN}$: the flow rate, in ml/sec, of said fluid through the central nozzle;

H: the height of the tank in cm;

$H_{CN}$: the height, in cm, at which the outlet opening of the central nozzle is located above the bottom of the tank; and $A_{CN}$: the surface area, in $cm^2$, of the outlet opening of the central nozzle.

10. The method as claimed in claim 1, wherein said upwardly directed jet of said fluid is produced by means of the outlet opening of the central nozzle which is provided at a height of at least one tenth, above the bottom of the tank.

11. The method as claimed in claim 1, wherein said fluid is supplied at a predetermined flow rate ($F_{CN}$) to said central nozzle and at a predetermined total flow rate ($F_{tot}$) to said central nozzle and to said off-centered nozzles, said predetermined flow rate being at least equal to half of said predetermined total flow rate.

* * * * *